United States Patent
Yang et al.

(10) Patent No.: US 11,576,183 B2
(45) Date of Patent: Feb. 7, 2023

(54) METHOD OF RECEIVING DOWNLINK CHANNEL, METHOD OF SENDING DOWNLINK CHANNEL, TERMINAL AND BASE STATION

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 254 days.

(21) Appl. No.: 16/968,917

(22) PCT Filed: Jan. 22, 2019

(86) PCT No.: PCT/CN2019/072651
§ 371 (c)(1),
(2) Date: Aug. 11, 2020

(87) PCT Pub. No.: WO2019/154066
PCT Pub. Date: Aug. 15, 2019

(65) Prior Publication Data
US 2021/0051667 A1 Feb. 18, 2021

(30) Foreign Application Priority Data

Feb. 11, 2018 (CN) .......................... 201810142918.8
Feb. 14, 2018 (CN) .......................... 201810151459.X
Feb. 28, 2018 (CN) .......................... 201810169276.0

(51) Int. Cl.
*H04W 72/04* (2009.01)
*H04W 72/10* (2009.01)
*H04W 56/00* (2009.01)

(52) U.S. Cl.
CPC ..... *H04W 72/0493* (2013.01); *H04W 56/001* (2013.01); *H04W 72/042* (2013.01); *H04W 72/0446* (2013.01); *H04W 72/10* (2013.01)

(58) Field of Classification Search
CPC ........... H04W 72/0493; H04W 72/042; H04W 72/0446; H04W 72/10; H04W 56/001
See application file for complete search history.

(56) References Cited

U.S. PATENT DOCUMENTS

2019/0222284 A1* 7/2019 Huang ................ H04W 72/042
2020/0077369 A1* 3/2020 Zhang .................. H04L 5/0053
(Continued)

FOREIGN PATENT DOCUMENTS

CN           107659994 A      2/2018

OTHER PUBLICATIONS

Nokia, R1-1801054, 'Summary of QCL', 3GPP TSG RAN WG1 Meeting AH 1801, Vancouver, Canada, Jan. 22-26, 2018, pp. 1-25 (legible IDS NPL reference). (Year: 2018).*

(Continued)

*Primary Examiner* — Melvin C Marcelo
(74) *Attorney, Agent, or Firm* — Brooks Kushman P.C.

(57) ABSTRACT

A method of receiving downlink channel, a method of sending downlink channel, a terminal and a base station are provided. The method includes: determining a TCI state of a downlink control channel, where in the case that the terminal switches back to an original BWP, the TCI state is a TCI state of a CORESET last used on the original BWP by the terminal, and the downlink control channel is sent on the CORESET of the original BWP; and receiving the downlink control channel according to the TCI state.

12 Claims, 8 Drawing Sheets

(56) References Cited

U.S. PATENT DOCUMENTS

2020/0145982 A1\* 5/2020 Cheng ................. H04W 72/048
2020/0288479 A1\* 9/2020 Xi ...................... H04W 72/042

OTHER PUBLICATIONS

Intel, R1-1800311, 'Remaining Issues on Beam Management', 3GPP TSG-RAN WG1 Meeting AH 1801, Vancouver, Canada, Jan. 22-26, 2018, pp. 1-4. (Year: 2018).\*

First Office Action dated Apr. 8, 2020 issued in Chinese Application No. 201810169276.0.

3GPP TSG RAN WG1 Meeting #90-bis, R1-1717424, Prague, Czechia, Oct. 9-13, 2017, "Discussion on beam management", 12 pages.

3GPP TSG RAN WG1 Meeting #91, R1-1721696, Reno, USA, Nov. 27-Dec. 1, 2017, "Summary of Beam Mgmt", 16 pages.

3GPP TSG-RAN WG1 NR Ad hoc 1801, R1801256, Vancouver, Canada, Jan. 22-26, 2018, LS reply to RAN2 on MAC CE for MIMO.

First Office Action for Korean Application No. 10-2020-7024388, dated Mar. 8, 2022, 5 Pages.

Huawei, et al., "Summary of Remaining Issues of Beam Measurement, Reporting and Indication," 3GPP TSG RAN WG1 Meeting, Jan. 22-26, 2018, R1-1800100, Item 7.2.2.3, Vancouver, Canada, 13 Pages.

Japanese Office Action, dated Sep. 30, 2021, 5 Pages, Japan.

Nokia, Summary of QCL, Jan. 22-26, 2018, 25 Pages, 7.2.3.7, Nokia Shanghai Bell, Vancouver, Canada.

Extended European Search Report dated Feb. 19, 2021 issued in PCT/CN2019/072651.

3GPP TS 38.213; 3rd Generation Partnership Project; Technical Specification Group Radio Access Network; NR; Physical layer procedures for control (Release 15); Jan. 3, 2018, pp. 1-56.

3GPP TS 38.21 4 v15.0.0 (Dec. 2017); 3rd Generation Partnership Project; Technical Specification Group Radio Access Network; NR; Physical layer procedures for data (Release 15); Jan. 3, 2018; pp. 1-71.

3GPP TSG RAN WG1 NR Ad-Hoc Meeting; R1-1711424; Qingdao, China, Jun. 27-30, 2017; "On bandwidth adaptation"; 5 pages.

3GPP TSG RAN WG1 Meeting AH 1801; R1-1800185; Vancouver, Canada, Jan. 22-26, 2018; "Remaining issues and text proposals on beam measurement and reporting"; 9 pages.

3GPP TSG-RAN WG2 NR #99 Meeting; R2-1708088 (Update of R2-1706427); Beriin, Germany, Aug. 21-25, 2017; "RAN2 considerations for bandwidth part in NR"; 5 pages.

Second Office Action for Chinese Application No. 202010813234.3, dated Jul. 5, 2022, 5 Pages.

Ericsson, "MAC CEs for Activating an RS Resource and Handling Corresponding TCI States," 3GPP TSG-RAN WG2 #100, Agenda item 10.3.1.13, Nov. 27-Dec. 1, 2017, Tdoc R2-1713533, Reno, NV, USA, 4 Pages.

\* cited by examiner

METHOD OF RECEIVING DOWNLINK CHANNEL, METHOD OF SENDING DOWNLINK CHANNEL, TERMINAL AND BASE STATION

CROSS REFERENCE OF RELATED APPLICATION

The present application is the U.S. national phase of PCT Application PCT/CN/2019/072651 filed on Jan. 22, 2019, which claims a priority of Chinese patent application No. 201810142918.8 filed on Feb. 11, 2018, a priority of Chinese patent application No. 201810151459.X filed on Feb. 14, 2018 and a priority of Chinese patent application No. 201810169276.0 filed on Feb. 28, 2018, which are incorporated herein by reference in their entirety.

TECHNICAL FIELD

The present disclosure relates to the field of communications technologies, and in particular, to a method of receiving downlink channel, a method of sending downlink channel, a terminal and a base station.

BACKGROUND

In the fifth generation (5G) communication system, the operating frequency band supported by the system is increased to above 6 GHz, up to about 100 GHz, thereby adopting a multi-beam transmission in the 5G communication system. For the multiple beam transmission, the 5G communication system can indicate the beam information to the terminal through a transmission configuration indication (Transmission Configuration Indication, TCI) state. In addition, in the 5G communication system, a maximum channel bandwidth of each carrier is 400 MHz, while the maximum bandwidth supported by the terminal may be less than 400 MHz, so a bandwidth part (Bandwidth Part, BWP) concept is newly introduced in the 5G communication system, the UE may work on multiple BWPs. In this way, in actual applications, a BWP switching or movement of the terminal will occur. However, in the 5G communication system in the related art, it is not clear how to configure the TCI state in these situations, resulting in a low reliability and accuracy of data transmission.

SUMMARY

A method of receiving downlink channel, a method of sending downlink channel, a terminal and a base station are provided in the embodiments of the present disclosure, to solve the issue of low reliability and accuracy of data transmission.

In a first aspect, a method of receiving downlink channel applied to a terminal is provided in an embodiment of the present disclosure, including:

determining a Transmission Configuration Indication (TCI) state of a downlink control channel, where in the case that the terminal switches back to an original Bandwidth Part (BWP), the TCI state is a TCI state of a Control Resource Set (CORESET) last used on the original BWP by the terminal, and the downlink control channel is sent on the CORESET of the original BWP; and receiving the downlink control channel according to the TCI state.

In a second aspect, a method of receiving downlink channel applied to a terminal is provided in an embodiment of the present disclosure, including:

determining a TCI state of a downlink data channel, where the TCI state is a TCI state of a CORESET or a newly determined TCI state, and the CORESET is a CORESET with a lowest identification in a time domain resource on which Downlink Control Information (DCI) is transmitted, and the DCI is configured to schedule the downlink data channel; and receiving the downlink data channel according to the TCI state.

In a third aspect, a method of sending downlink channel applied to a base station is provided in an embodiment of the present disclosure, including:

determining a TCI state of a downlink control channel, where the TCI state is a TCI state of a CORESET last used on an original BWP by the base station, and the downlink control channel is sent on the CORESET of the original BWP; and sending the downlink control channel according to the TCI state.

In a fourth aspect, a method of sending downlink channel applied to a base station is provided in an embodiment of the present disclosure, including:

determining a TCI state of a downlink data channel, where the TCI state is a TCI state of a CORESET or a newly determined TCI state, and the CORESET is a CORESET with a lowest identification in a time domain resource on which DCI is transmitted, and the DCI is configured to schedule the downlink data channel; and sending the downlink data channel according to the TCI state.

In a fifth aspect, a terminal is provided in an embodiment of the present disclosure, including:

a control channel determining module, configured to determine a TCI state of a downlink control channel, where in the case that the terminal switches back to an original BWP, the TCI state is a TCI state of a CORESET last used on the original BWP by the terminal, and the downlink control channel is sent on the CORESET of the original BWP; and a control channel receiving module, configured to receive the downlink control channel according to the TCI state.

In a sixth aspect, a terminal is provided in an embodiment of the present disclosure, including:

a data channel determining module, configured to determine a TCI state of a downlink data channel, where the TCI state is a TCI state of a CORESET or a newly determined TCI state, and the CORESET is a CORESET with a lowest identification in a time domain resource on which DCI is transmitted, and the DCI is configured to schedule the downlink data channel; and a data channel receiving module, configured to receive the downlink data channel according to the TCI state.

In a seventh aspect, a base station is provided in an embodiment of the present disclosure, including:

a control channel determining module, configured to determine a TCI state of a downlink control channel, where the TCI state is a TCI state of a CORESET last used on an original BWP by the base station, and the downlink control channel is sent on the CORESET of the original BWP; and a control channel sending module, configured to send the downlink control channel according to the TCI state.

In an eighth aspect, a base station is provided in an embodiment of the present disclosure, including:

a data channel determining module, configured to determine a TCI state of a downlink data channel, where the TCI state is a TCI state of a CORESET or a newly determined TCI state, and the CORESET is a CORESET with a lowest identification in a time domain resource on which DCI is transmitted, and the DCI is configured to schedule the downlink data channel;

a data channel sending module, configured to send the downlink data channel according to the TCI state.

In a ninth aspect, a terminal is provided in an embodiment of the present disclosure, including: a memory, a processor and a computer program stored in the memory and executable on the processor, where the processor executes the computer program to perform the method of receiving downlink channel in the first aspect above, or the processor executes the computer program to perform the method of receiving downlink channel in the second aspect above.

In a tenth aspect, a base station is provided in an embodiment of the present disclosure, including: a memory, a processor and a computer program stored in the memory and executable on the processor, where the processor executes the computer program to perform the method of sending downlink channel in the third aspect above, or the processor executes the computer program to perform the method of sending downlink channel in the fourth aspect above.

In an eleventh aspect, a computer-readable storage medium is provided in an embodiment of the present disclosure, where a computer program is stored in the computer-readable storage medium, a processor executes the computer program to perform the method of receiving downlink channel in the embodiments of the present disclosure, or the processor executes the computer program to perform the method of sending downlink channel in the embodiments of the present disclosure.

According to the embodiments of the present disclosure, the reliability and accuracy of data transmission may be improved.

DETAILED DESCRIPTION

The technical solutions in the embodiments of the present disclosure will be clearly and completely described below in conjunction with the drawings in the embodiments of the present disclosure. Obviously, the described embodiments are part of the embodiments of the present disclosure, rather than all of them. Based on the embodiments in the present disclosure, all other embodiments obtained by those of ordinary skill in the art without creative work shall fall within the scope of the present disclosure. In the specification and claims, "and/or" means at least one of the connected objects.

Figure 1:
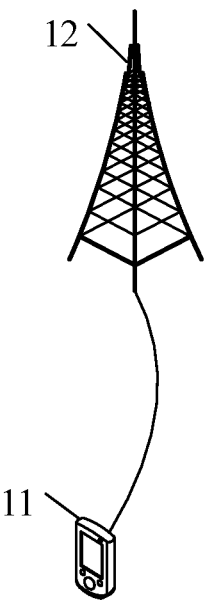
FIG. 1 is a structural view of a network system applicable to the embodiments of the present disclosure.

Referring to FIG. 1 which is a structural view of a network system applicable to an embodiment of the present disclosure, as shown in FIG. 1, the network system includes a terminal 11 and a base station 12. The terminal 11 may also be referred to as a terminal device or a user terminal (UE), and the terminal 11 may be a mobile phone, a tablet personal computer), a Laptop Computer), a Personal Digital Assistant (PDA), a Mobile Internet Device (MID), a Wearable Device, or in-vehicle device and other terminal side devices. It should be noted that the specific type of terminal 11 is not limited in the embodiments of the present disclosure. The aforementioned base station 12 may be a base station of 5G and later versions (for example, gNB, 5G NR NB), or a base station in other communication systems, or called Node B, Evolved Node B, or other words in the field, as long as it reaches the same technical effect, the base station is not limited to a specific technical vocabulary. It should be noted that in the embodiment of the present disclosure, only a 5G base station is taken as an example, but the specific type of the base station 12 is not limited.

It should be noted that the specific functions of the terminal 11 and the base station 12 in the embodiments of the present disclosure will be described in detail through the following embodiments.

Figure 2:
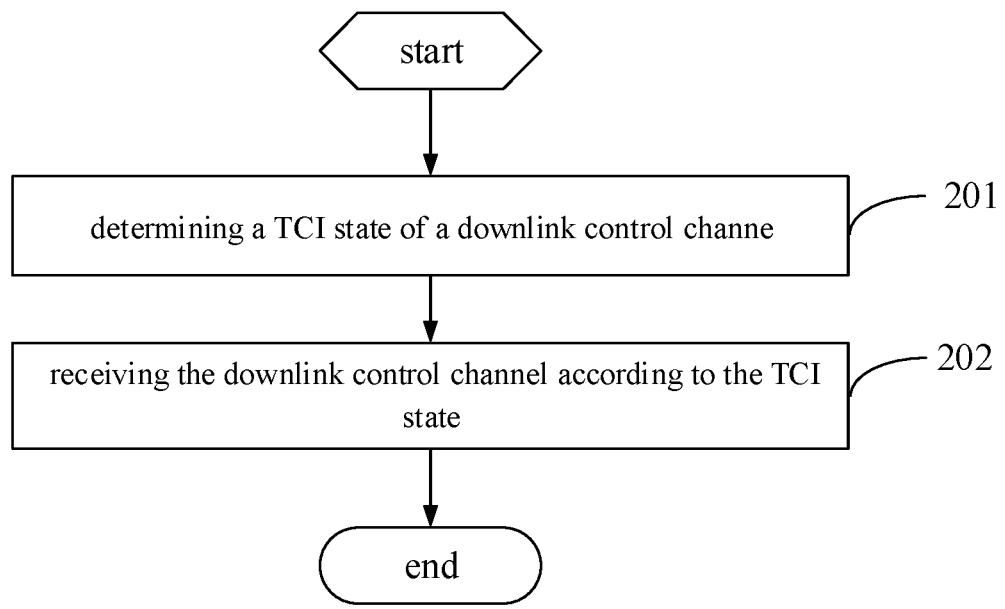
FIG. 2 is a flowchart of a method of receiving downlink channel in an embodiment of the present disclosure.

Referring to FIG. 2 which is a flowchart of a method of receiving downlink channel in to an embodiment of the present disclosure. The method is applied to a terminal, as shown in FIG. 2, and the method includes the following steps:

Step 201: determining a Transmission Configuration Indication (TCI) state of a downlink control channel, where in the case that the terminal switches back to an original Bandwidth Part (BWP), the TCI state is a TCI state of a Control Resource Set (CORESET) last used on the original BWP by the terminal, and the downlink control channel is sent on the CORESET of the original BWP.

The TCI state of the downlink control channel may be: a TCI state for receiving the downlink control channel. The TCI state may refer to the transmission configuration information of the downlink control channel, for example, indicating the Quasi-colocation (Quasi-colocation, QCL) or other configuration information of the downlink control channel.

In the foregoing steps, the switching back to the original BWP may mean that before the terminal switches back to the original BWP, the terminal has worked on the original BWP the terminal switches to another BWP, and then the terminal switches back to the original BWP again. For example, the terminal works on BWP1, a BWP switching is performed on the terminal to switch the terminal to BWP2, and then the terminal switches back to BWP1 again.

In addition, the TCI state of the CORESET last used on the original BWP may be the TCI state of the CORESET last used on the original BWP after the terminal switches back to the original BWP. For example, the terminal uses the first TCI state to receive on BWP1, and a BWP switching is performed on the terminal to switch the terminal to BWP2 for work. After that, the terminal switches back to BWP1 again, then the terminal switches back to BWP1 and continues to use the first TCI state to perform a reception, that is, the first TCI state is the most recently used TCI state. Of course, the last used mentioned above can also be referred to as the last time, or it can be referred to as the TCI state of CORESET used by the terminal on the original BWP before the terminal switches back to the original BWP. It should be noted that the BWP of the terminal is an active BWP, and the above-mentioned terminal switches back to the original BWP, then the original BWP is the active BWP of the terminal.

In this step, since the terminal switches back to the original BWP, it can use the TCI state of the CORESET last used on the original BWP to receive the downlink control channel, which may prevent the terminal from being unable to determine the used CORESET when switching back to the original BWP, because after the terminal switches back to the original BWP, the base station may not re-configure the TCI state of the CORESET of the original BWP for the terminal, thereby improving the reliability and accuracy of data transmission. In addition, the TCI state of the CORESET last used on the original BWP is directly used, so the process of configuring the TCI state may be saved so as to save the transmission overhead and power consumption of the terminal and the base station.

The aforementioned downlink control channels include, but are not limited to: Physical Downlink Control Channel (PDCCH), Physical Broadcast Channel PBCH), and so on.

202: receiving the downlink control channel according to the TCI state.

This step may include: determine a receiving beam according to the above TCI state, so as to use the receiving beam to receive the above downlink control channel. For example, for the downlink control channel, a RS resource in a Reference Signal set (RS set) corresponding to the TCI state and a Demodulation Reference Signal (DMRS) port of the downlink control channel of the terminal are QCL, so that the terminal may determine the receiving beam for receiving the downlink control channel according to the TCI state, for example, the receiving beam of the RS resource corresponding to the TCI state is used as the receiving beam for receiving the downlink control channel.

Through the above steps, the terminal can determine the TCI state of the downlink control channel in scenarios such as BWP switching, thereby improving the reliability and accuracy of data transmission. In addition, the base station (or called the network side) and the terminal both determine the TCI state in the same way, that is, the base station and the terminal accurately and consistently understand the TCI states of the downlink control channel and the downlink data channel.

It should be noted that the above-mentioned method provided in the embodiments of the present disclosure may be applied to 5G systems, but are not limited thereto, as long as the same function can be achieved, and the method is suitable for other communication systems, for example, a 6G system or other communication system applying the TCI State and so on.

Optionally, before the determining the TCI state of the downlink control channel, the method further includes:

performing a reception on the original BWP, according to a first TCI state configured by a base station for the CORESET of the original BWP;

switching to another BWP, and performing a reception on the another BWP according to a TCI state configured by the base station for a CORESET of the another BWP; and switching from the another BWP to the original BWP, where the TCI state of the CORESET last used on the original BWP is the first TCI state.

The above-mentioned first TCI state may be a TCI state configured by the base station through a Radio Resource Control (RRC) signaling, or one TCI state indicated by a Media Access Control (MAC) Control Element (CE) of multiple TCI states configured by the base station through a RRC signaling. For example, the base station communicates with the terminal on the aforementioned original BWP which is an active BWP, the base station may send the PDCCH according to the TCI state of CORESET on the BWP, and the terminal receives the PDCCH through the aforementioned first TCI state.

The switching to another BWP may refer to: the terminal switches from the original BWP to another BWP, or the terminal switches from the original BWP to a BWP other than the original BWP and then switches from the BWP to another BWP. In other words, the above-mentioned other BWP may be one BWP, or multiple BWPs which the terminal switches to. For example, when a BWP switching command carried in the DCI on the PDCCH is received in the original BWP, the terminal switches to another BWP according to the command, and the another BWP becomes the active BWP at this time. On the new active BWP, the terminal may learn the TCI state of CORESET on the BWP according to the RRC configuration of the base station, to receive the PDCCH; or the terminal may learn the TCI state of CORESET on the BWP according to the RRC configuration and an MAC CE indication, to receive the PDCCH.

Then, after the terminal switches back to the original BWP, that is, the original BWP becomes the new active BWP, the terminal uses the TCI state of CORESET last used on the BWP on the new active BWP, that is, uses the above-mentioned first TCI state. For example, when the terminal switches back to the original BWP again according to the BWP switching command notified by the DCI on the active BWP (the active BWP may be another BWP which the terminal switches to from the above-mentioned original BWP), the original BWP becomes the new active BWP, and the TCI state of the CORESET on the BWP is still effective, and the terminal receives the PDCCH according to these effective TCI states.

According to the embodiment of the present disclosure, when the terminal switches to a BWP, the last TCI state of the CORESET on this BWP is used on the new active BWP, so as to enable the terminal to determine the TCI state when the BWP switching is performed, thereby improving the reliability and accuracy of data transmission, saving the transmission overhead and saving the power consumption overhead of the terminal and the base station.

Optionally, before the base station reconfigures, reactivates or re-indicates a second TCI state for the CORESET of the original BWP, the terminal uses the first TCI state on the original BWP.

In this way, the terminal uses the first TCI state to receive the downlink control channel on the original BWP until the base station reconfigures, reactivates or re-indicates a new TCI state, thereby reducing a complexity of receiving the downlink channel by the terminal.

According to the embodiments of the present disclosure, the reliability and accuracy of data transmission may be improved.

Figure 3:
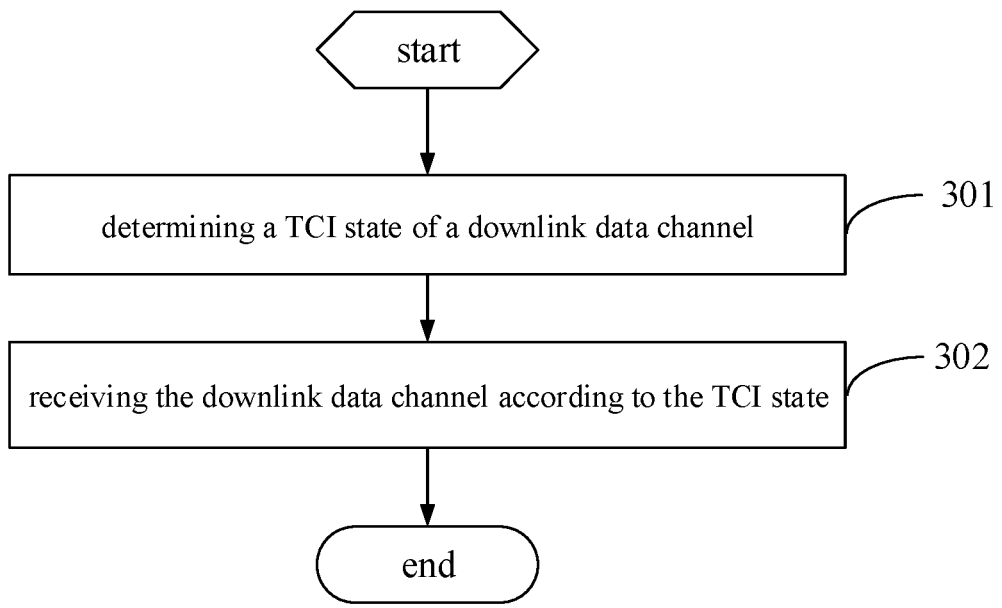
FIG. 3 is a flowchart of another method of receiving downlink channel in an embodiment of the present disclosure.

Referring to FIG. 3 which is a flowchart of another downlink channel receiving method in an embodiment of the present disclosure. The method is applied to a terminal, as shown in FIG. 3, the method includes the following steps:

Step 301: determining a TCI state of a downlink data channel, where the TCI state is a TCI state of a CORESET or a newly determined TCI state, and the CORESET is a CORESET with a lowest identification in a time domain resource on which DCI is transmitted, and the DCI is configured to schedule the downlink data channel;

In this step, the TCI state of the downlink data channel may be directly determined as the above-mentioned TCI state of the CORESET or the newly determined TCI state, thereby preventing the terminal from determining the TCI state when the terminal moves or switches to a beam where a new synchronization signal block (Synchronization Signal Block, SSB) is located, thereby improving the reliability and accuracy of data transmission.

It should be noted that there are two cases for the CORESET with the lowest identification in the time domain resource on which the DCI is transmitted. One is, the CORESET is a CORESET with the lowest identification among all CORESETs, for example, CORESET0 (CORESET with identification 0), and the other is: the CORESET is a CORESET with the lowest identification other than the CORESET0 in the current BWP of the terminal, for example, CORESET1.

The newly determined TCI state may be a TCI state determined when the terminal determines the TCI state of the downlink data channel, e.g., the TCI state configured, activated or indicated by the base station for the terminal. Of course, in some embodiments, the aforementioned newly determined TCI state may also be referred to as a reconfigured, reactivated, or re-indicated TCI state.

In addition, the above-mentioned time domain resource may be a time domain resource such as a slot or a subframe. The aforementioned downlink control channels include, but are not limited to: Physical Downlink Control Channel (PDCCH), Physical Broadcast Channel (PBCH), and so on. The aforementioned downlink data channel may be a Physical Downlink Shared Channel (PDSCH).

Step 302: receiving the downlink data channel according to the TCI state.

This step may include: determine a receiving beam according to the above TCI state, so as to use the receiving beam to receive the above downlink data channel. For example, for the downlink data channel, a RS resource in a Reference Signal set (RS set) corresponding to the TCI state and a Demodulation Reference Signal (DMRS) port of the downlink data channel to be scheduled are QCL, so that the terminal may determine the receiving beam for receiving the downlink data channel according to the TCI state, for example, the receiving beam of the RS resource corresponding to the TCI state is used as the receiving beam for receiving the downlink data channel.

Through the above steps, the terminal can determine the TCI state of the downlink data channel in scenarios such as BWP switching, thereby improving the reliability and accuracy of data transmission. In addition, the base station (or called the network side) and the terminal both determine the TCI state in the same way, that is, the base station and the terminal accurately and consistently understand the TCI states of the downlink control channel and the downlink data channel. Those skilled in the art may understand that the base station is only an example for illustration, and the sending and receiving node TRP or other units that can implement the same function may also be included in the range of the base station, and the embodiments of the present disclosure are not limited thereto.

It should be noted that the above-mentioned method provided in the embodiments of the present disclosure may be applied to 5G systems, but are not limited thereto, as long as the same function can be achieved, and the method is suitable for other communication systems, for example, a future evolved system or other communication system applying the TCI State and so on.

Optionally, the receiving the downlink data channel according to the TCI state includes:

receiving the downlink data channel according to a spatial Quasi-colocation (QCL) parameter indicated by the TCI state.

In some embodiments of the present disclosure, it can be achieved that the above-mentioned TCI state is at least used to indicate the spatial QCL parameter, so that the terminal uses the spatial QCL parameter to receive the downlink data channel. Of course, the base station may also use the spatial parameter to send the downlink data channel.

It should be noted that, in this embodiment, the above TCI state is not limited to only indicating spatial QCL parameters, but also indicating other parameters related to transmission configuration, and then these parameters may be used to receive the downlink data channel.

Optionally, in the case that a scheduling offset of the DCI is smaller than or equal to a preset threshold, the TCI state is the TCI state of the CORESET, and the CORESET is the CORESET with the lowest identification on an active BWP in the time domain resource.

The above scheduling offset may refer to a time interval from the time when DCI is received to the time when the DCI is effective, and the above preset threshold (which may be represented by k) may be a threshold predefined by an agreement, or a threshold pre-configured by the base station, or a threshold value agreed by the terminal and the base station in advance, which is not limited herein.

In addition, in this embodiment, when the scheduling offset of the DCI is smaller than or equal to the preset threshold (for example, scheduling offset is <=k), the TCI of the downlink data channel is a default TCI state, the default TCI state is a TCI state of the CORESET with the lowest identification on the active BWP in the aforementioned time domain resources.

In this embodiment, since the TCI state of the downlink data channel is the TCI state of the CORESET with the lowest identification on the active BWP in the above-mentioned time domain resource, that is, the TCI state is a TCI state of the CORESET with the lowest identification on one BWP, rather than a TCI state of the CORESET with the lowest identification of all CORESETs on a plurality of or all BWPs. Therefore, the following case may be avoided: if the network configures a CORESET for each BWP, the terminal will not know which BWP the CORESET with the lowest identification is on, making the terminal unable to determine the TCI state of the downlink data channel. Therefore, the reliability and accuracy of data transmission may be improved.

It should be noted that, in this embodiment, the CORESET with the lowest identification on the active BWP may be the CORESET with the lowest identification among all CORESETs in the active BWP, that is, when selecting the CORESET with the lowest identification, the CORESET with identification 0 will be considered. For example, if the active BWP includes the CORESET with identification 0, the CORESET with identification 0 is selected.

Optionally, in this embodiment, in the case that the DCI includes a TCI field or does not include a TCI field, the TCI state is the TCI state of the CORESET.

The CORESET here is the CORESET with the lowest identification on the active BWP in the aforementioned time domain resources.

For example, the base station communicates with the terminal on a certain BWP, the BWP is the active BWP, and the terminal receives the PDCCH according to the TCI state of the CORESET on the BWP. In addition, the base station configures whether the TCI field is on the DCI of the PDCCH through a high-level signaling. Regardless of whether there is a TCI field, when the scheduling offset of the DCI of the PDSCH scheduled by the PDCCH is smaller than or equal to the preset threshold (for example, scheduling offset is <=k), the terminal receives the PDSCH according to the default TCI state, the default TCI state is a TCI state of the CORESET with the lowest identification on the active BWP in the time slot of the DCI.

In this embodiment, the TCI state is the TCI state of the CORESET whether the DCI includes a TCI field or not, so the complexity of the terminal is reduced.

It should be noted that in this embodiment, the point is how to determine the TCI state of the downlink data channel. However, in the actual data transmission process, in addition to receiving the downlink data channel, the terminal also needs to receive the downlink control channel. Then, in this embodiment, the TCI state of the downlink control channel may refer to the embodiment in FIG. 2, which will not be repeated here, and the same beneficial effect can be achieved. In addition, when the terminal switches back to the original BWP, the active BWP in this embodiment may be the original BWP which the terminal switches back to, since the original BWP will be the active BWP after the terminal switches back to the original BWP.

Of course, the downlink control channel in this embodiment may also be the TCI state of CORESET configured by the base station through a RRC signaling, or the TCI state of CORESET indicated by the base station through the RRC signaling and the MAC CE.

In another embodiment of the present disclosure, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification other than a CORESET with identification 0 in the time domain resource.

For the foregoing scheduling offset and the preset threshold value, reference may be made to the corresponding description of the above embodiment, which is not repeated here.

When the scheduling offset of the DCI is smaller than or equal to the preset threshold, the TCI state of the downlink data channel may be the default TCI state, the default TCI state is used for the QCL indication of the control channel on the CORESET, and the default TCI state is the TCI state of the CORESET with the lowest identification other than a CORESET with identification 0 in the time domain resource on which the DCI is transmitted, that is, the CORESET is a CORESET with an identification greater than 0.

In practical applications, during an initial access, the terminal selects an optimal SSB according to a measurement, and uses the Physical Random Access Channel (PRACH) resource associated with the optimal SSB to initiate an accessing. After the random access is completed, the CORESET with identification 0 may be configured on a Physical Broadcast Channel (PBCH), and the CORESETs with other identification may be configured by the base station through a high-level signaling.

After the terminal completes the random access, when the terminal will measure the SSB sent by the network when terminal is moving, and may switch to the current optimal SSB according to a measurement result, and the PBCH in this SSB will also be configured with a CORESET with identification 0. In this way, the terminal will receive the PDSCH using the TCI state of the CORESET with identification 0 configured by the PBCH in the current SSB. However, the base station does not know that the CORESET with identification 0 has changed due to the movement of the terminal, and still uses the TCI state of the CORESET with identification 0 to send the PDSCH to the terminal, so the data transmission cannot be performed correctly.

According to the embodiment of the present disclosure, the TCI state of the downlink data channel is the TCI state of CORESET, and the CORESET is the CORESET with the lowest identification in the time domain resource other than the CORESET with identification 0, so the above issue can be avoided. Because the CORESET other than the CORESET with identified 0 is not configured through an SSB, but configured through a high-level signaling, so even if the terminal switches the SSB, the terminal and the base station may use the same CORESET TCI state for data transmission, thereby ensuring the reliability and accuracy of data transmission.

For example, during an initial access, the terminal selects an optimal SSB according to a measurement, and uses the Physical Random Access Channel (PRACH) resource associated with the optimal SSB to initiate an accessing. After the random access is completed, the CORESET with identification 0 is configured on a Physical Broadcast Channel (PBCH), and the CORESETs with other identification are configured by the base station through a high-level signaling. When the terminal moves, the terminal can measure the SSB sent by the base station and switch to the current optimal SSB according to the measurement result. The PBCH in the SSB is also configured with a CORESET with identification 0. When the base station schedules the terminal, the PDCCH is sent on the CORESET of the active BWP (also referred to as the current BWP), and the terminal receives the PDSCH according to the signaling on the PDCCH. Specifically, when the scheduling offset of the DCI is smaller than or equal to the preset threshold (for example, scheduling offset is <=k), the terminal receives the PDSCH according to the default TCI state which is the control channel QCL indication, and the control channel QCL indication is determined by the TCI state of the CORESET with the lowest identification other than the CORESET with identification 0 in the time slot of the DCI.

Optionally, in this embodiment, in the case that the DCI includes a TCI field or does not include a TCI field, the TCI state is the TCI state of the CORESET.

The CORESET is the CORESET with the lowest identification on an active BWP in the time domain resource.

In this embodiment, the TCI state is the TCI state of the CORESET whether the DCI includes a TCI field or not, so the complexity of the terminal is reduced.

It should be noted that in this embodiment, the point is how to determine the TCI state of the downlink data channel. However, in the actual data transmission process, in addition to receiving the downlink data channel, the terminal also needs to receive the downlink control channel. Then, in this embodiment, the TCI state of the downlink control channel may refer to the embodiment in FIG. 2, which will not be repeated here, and the same beneficial effect can be achieved. In addition, when the terminal switches back to the original BWP, the active BWP in this embodiment may be the original BWP which the terminal switches back to, since the original BWP will be the active BWP after the terminal switches back to the original BWP.

Of course, the downlink control channel in this embodiment may also be the TCI state of CORESET configured by the base station through a RRC signaling, or the TCI state of CORESET indicated by the base station through the RRC signaling and the MAC CE.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification in CORESETs used for a unicast transmission in the time domain resource.

For the foregoing scheduling offset and the preset threshold value, reference may be made to the corresponding description of the above embodiment, which is not repeated here.

In the case that the scheduling offset of the DCI is smaller than or equal to the preset threshold, the TCI state of the downlink data channel may be a default TCI state used for the QCL indication of the control channel on CORESET, and the default TCI state is the TCI state of the CORESET with the lowest identification in CORESETs used for a unicast transmission in the time domain resource on which the DCI is transmitted, that is, the CORESET here is the CORESET with the lowest identification among the CORESETs used for a unicast transmission.

Optionally, in this embodiment, in the case that the DCI includes a TCI field or does not include a TCI field, the TCI state is the TCI state of the CORESET.

The CORESET is the CORESET with the lowest identification on an active BWP in the time domain resource.

In this embodiment, the TCI state is the TCI state of the CORESET whether the DCI includes a TCI field or not, so the complexity of the terminal is reduced.

It should be noted that in this embodiment, the point is how to determine the TCI state of the downlink data channel. However, in the actual data transmission process, in addition to receiving the downlink data channel, the terminal also needs to receive the downlink control channel. Then, in this embodiment, the TCI state of the downlink control channel may refer to the embodiment in FIG. 2, which will not be repeated here, and the same beneficial effect can be achieved. In addition, when the terminal switches back to the original BWP, the active BWP in this embodiment may be the original BWP which the terminal switches back to, since the original BWP will be the active BWP after the terminal switches back to the original BWP.

Of course, the downlink control channel in this embodiment may also be the TCI state of CORESET configured by the base station through a RRC signaling, or the TCI state of CORESET indicated by the base station through the RRC signaling and the MAC CE.

Optionally, a receiving of a downlink control channel or the downlink data channel is performed according to the TCI state with a high priority within a collision period, according to a preset priority rule or a priority rule configured by a base station.

The collision period includes: an overlapping period between a using period of the TCI state of the downlink data channel and a using period of a TCI state for the current receiving of downlink control channel, or an overlapping period between a using period of the TCI state of the downlink data channel and a using period of a TCI state of a current downlink data channel. The TCI state for the current receiving of downlink control channel is configured by the base station for receiving the downlink control channel, the TCI state of the current downlink data channel is a TCI state for downlink data channel which is indicated by the base station and effective.

The TCI state of the downlink data channel is the TCI state determined in step 301. In addition, the using period of each TCI state mentioned above may be the time of using each TCI state. For example, the using period of the TCI state of the above downlink data channel includes time slot 4 and time slot 5, and the using period of the TCI state for the current receiving of downlink control channel is the first 2 symbols of time slot 4, then the above collision period includes the first 2 symbols of time slot 4. If the using period of the TCI state of the current downlink data channel includes time slot 5, the collision time mentioned above further includes time slot 5.

It should be noted that the TCI state of the downlink data channel that has taken effect above may be a TCI state within a period when a scheduling offset is greater than a preset threshold in a period of a data channel scheduled by another DCI.

The preset priority rule or the priority rule configured by the base station includes at least one of:

a priority of the TCI state for the current receiving of downlink control channel is higher than a priority of the TCI state of the downlink data channel;

the priority of the TCI state for the current receiving of downlink control channel is lower than the priority of the TCI state of the downlink data channel;

a priority of the TCI state of the current downlink data channel is higher than the priority of the TCI state of the downlink data channel;

the priority of the TCI state of the current downlink data channel is lower than the priority of the TCI state of the downlink data channel.

In this embodiment, the collision can be avoided, so as to further improve the reliability and accuracy of data transmission.

Optionally, at least one of the downlink data channel and a downlink reference signal is received according to a preset rule or a rule configured by a base station within a collision period;

where the collision period includes: an overlapping period between a using period of the TCI state of the downlink data channel and a using period of a TCI state of the downlink reference signal, the TCI state of the downlink reference signal is configured or indicated by the base station for receiving the downlink reference signal.

In this embodiment, since at least one of the downlink data channel and the downlink reference signal is received during the collision period according to the preset rule or the rule configured by the base station, the flexibility of data transmission may be improved, the collision may be solved, and the data transmission performance may be improved.

The downlink reference signal includes at least one of a Channel State Information Reference Signal (CSI-RS) and a Synchronization Signal Block (SSB). Of course, it can also be other reference signals, which is not limited.

In addition, the TCI state of the downlink data channel indicates a spatial Quasi-colocation (QCL) parameter for receiving the downlink data channel, the TCI state of the downlink reference signal indicates a spatial QCL parameter for receiving the downlink reference signal.

In this way, at least one of the downlink data channel and the downlink reference signal may be received using the aforementioned spatial QCL parameter.

the preset rule or the rule configured by the base station includes:

within the collision period, the TCI state configured or indicated by the base station for receiving the downlink reference signal is the same as the TCI state of the downlink data channel; or within the collision period, the downlink data channel is received according to the TCI state configured or indicated by the base station for receiving the downlink reference signal.

In this embodiment, since the TCI state for receiving the downlink reference signal is the same as the TCI state of the downlink data channel, the downlink data channel is received using the TCI state configured or indicated by the base station for receiving the downlink reference signal, thereby avoiding the collision.

Optionally, the downlink data channel, the downlink control channel and the downlink reference signal are received within a collision period according to a preset rule or a rule configured by a base station.

The collision period includes: an overlapping period between a using period of the TCI state of the PDSCH/DMRS configured or indicated by the base station and a using period of the TCI state of the CSI-RS, or an overlapping period among the using periods of a plurality TCI states of the CORESET configured by the base station.

The TCI state of the PDSCH/DMRS indicates the spatial QCL parameter for receiving the PDSCH/DMRS. The TCI state of the CSI-RS indicates the spatial QCL parameter for receiving the CSI-RS. The TCI state of the CORESET indicates the spatial QCL parameter for receiving the PDCCH on the CORESET.

The preset priority rule or the priority rule configured by the base station includes at least one of the following:

a priority of the TCI state of the PDSCH/DMRS is higher than that of the TCI state of the CSI-RS;

the priority of the TCI state of the PDSCH/DMRS is lower than that of the TCI state of the CSI-RS;

the highest priority of the TCI state of the CORESET is the TCI state of the CORESET with the lowest identification or the TCI state of the CORESET with the highest identification.

The TCI state of the PDSCH/DMRS may be an effective TCI state scheduled by DCI.

The highest priority of the TCI state of the CORESET may also be a preset rule or other priority rule configured by the base station. For example, the TCI state of the CORESET with an identification having certain characteristics has the highest priority.

Optionally, prior to the determining the TCI state of the downlink data channel, the method further includes:

acquiring a TCI state which is determined by a base station for a CORESET with identification 0 through at least one of a configuring manner, an activating manner and an indicating manner, where the TCI state is at least configured to indicate an SSB index that has a QCI relationship with the CORESET with identification 0, and the newly determined TCI state is determined by at least one of the configuring manner, the activating manner and the indicating manner.

In this embodiment, since the TCI state of the CORESET identified by the base station is acquired, and the TCI state is at least used to indicate the SSB index that has a QCL relationship with the CORESET with identification 0, then the terminal can use the TCI state of the CORESET with identification 0 configured by the base station, that is, the downlink data channel is received on the beam of the SSB index that has a QCL relationship with the CORESET with identification 0. Since the TCI state is determined by the base station, both the base station and the terminal use the TCI state for data transmission, thereby ensuring the reliability and accuracy of data transmission.

There is no limitation on the timing of acquiring the TCI state of the CORESET with identification 0. For example, the base station may determine the TCI state for the terminal after the terminal reports the beam report, or the base station may determine the TCI state by measuring the uplink reference signal received by the base station. Optionally, the TCI state of the CORESET with identification 0 may be acquired when the terminal is in the connected state.

For example, before acquiring the TCI state determined by the base station for the CORESET with identification 0 through at least one of a configuring manner, an activating manner and an indicating manner, the method further includes:

performing a beam measurement on the reference signal configured by the network to obtain a beam report, where the beam report includes the index and quality information of N reference signals, where the N reference signals are the first N reference signals in terms of signal quality among the reference signals configured by the network, where N is an integer greater than 0;

reporting the beam report to the base station.

Therefore, the base station may determine the TCI state of the CORESET with identification 0 according to the above beam report.

The above-mentioned reference signal may be an SSB or a Channel State Information-Reference Signaling (CSI-RS). The above-mentioned N may be determined by the terminal, or pre-configured by the base station, or pre-defined in the protocol, etc. The above-mentioned the first N reference signals in terms of signal quality may be N reference signals ranked in an order from the reference signal with high signal quality to the reference signal with low signal quality. N-bit reference signals, that is, N reference signals with the best quality. The foregoing signal quality may be a Reference Signal Received Power (RSRP) or a Reference Signal Received Quality (RSRQ), etc.

In addition, after receiving the above beam report, the base station may determine the TCI state of the CORESET with identification 0 for the terminal according to the beam report, the base station may determine the TCI state of the CORESET with identification 0 through at least one of configuring manner, activating manner and indicating manner. For example, the base station may select one or more reference signals from the N reference signals and determine the index of the SSB for the terminal to learn the TCI state of the CORESET with identification 0.

For example, when the terminal performs an initial accessing, the terminal selects the optimal SSB according to the measurement, and initiates the accessing using the PRACH resource associated with the SSB. After the random access is completed, the CORESET with identification 0 is configured on the PBCH, and the CORESET with other identification is configured by the base station through a high-level signaling. When the base station schedules the terminal, the PDCCH is sent on the CORESET of the current BWP, and the terminal receives the PDSCH according to the signaling on the PDCCH. Specifically, when the terminal moves, the terminal performs a beam measurement on the SSB configured by the base station, that is, measuring the quality of the beam where the SSB is located (such as RSRP), and reports the measurement result to the base station through a beam report. The report includes an index of the optimal one or more SSBs and corresponding qualities thereof. According to the beam report, the base station indicates to the terminal the beam for receiving the downlink data channel. In addition, the base station sends a reconfiguration, reactivation, or re-indication command, the function of this command includes configuring the TCI state of CORESET with identification 0 (for example, QCL indication). The TCI state is indicated by the index of the SSB that has a QCL relationship with the CORESET with identification 0 determined by the base station. At this time, the terminal uses reconfiguration/reactivation/re-indication command of the base station to determine the TCI state of the CORESET with identification 0. When the base station schedules the terminal, when the DCI scheduling offset is smaller than or equal to the preset threshold (for example, scheduling offset is <=k), the base station receives the PDSCH according to the default TCI state, where the default TCI state is the TCI state of the CORESET with identification 0 which is reconfigured, reactivated or re-indicated by the base station.

Optionally, in this embodiment, when the scheduling offset of the DCI is smaller than or equal to a preset threshold, the TCI state of the downlink data channel is the newly determined TCI state.

The above-mentioned DCI is the DCI for scheduling the above-mentioned downlink data channel, so that when the scheduling offset is smaller than or equal to the preset threshold, the above-mentioned newly determined TCI state may be directly used.

Optionally, the configuring manner refers to configuring through a Radio Resource Control (RRC) signaling.

Optionally, the activating manner refers to: activating, by a Media Access Control Control Element (MAC CE), one of a plurality of TCI states configured through a RRC signaling.

Optionally, the indicating manner refers to indicating by an MAC CE or through a physical layer control signaling.

In this way, the TCI state of the CORESET with identification 0 can be determined through at least one of a RRC signaling, a MAC CE, a RRC signaling, a MAC CE and a physical layer control signaling, thereby avoiding the data transmission error caused by the base station and terminal using the TCI states of different CORESETs with identification 0 when the terminal performs an SSB switching, improving the reliability and accuracy of data transmission.

It should be noted that in this embodiment, the point is how to determine the TCI state of the downlink data channel. However, in the actual data transmission process, in addition to receiving the downlink data channel, the terminal also needs to receive the downlink control channel. Then, in this embodiment, the TCI state of the downlink control channel may refer to the embodiment in FIG. 2, which will not be repeated here, and the same beneficial effect can be achieved. In addition, when the terminal switches back to the original BWP, the active BWP in this embodiment may be the original BWP which the terminal switches back to, since the original BWP will be the active BWP after the terminal switches back to the original BWP.

Of course, the downlink control channel in this embodiment may also be the TCI state of CORESET configured by the base station through a RRC signaling, or the TCI state of CORESET indicated by the base station through the RRC signaling and the MAC CE.

According this embodiment, the reliability and accuracy of data transmission may be improved through the above steps.

Figure 4:
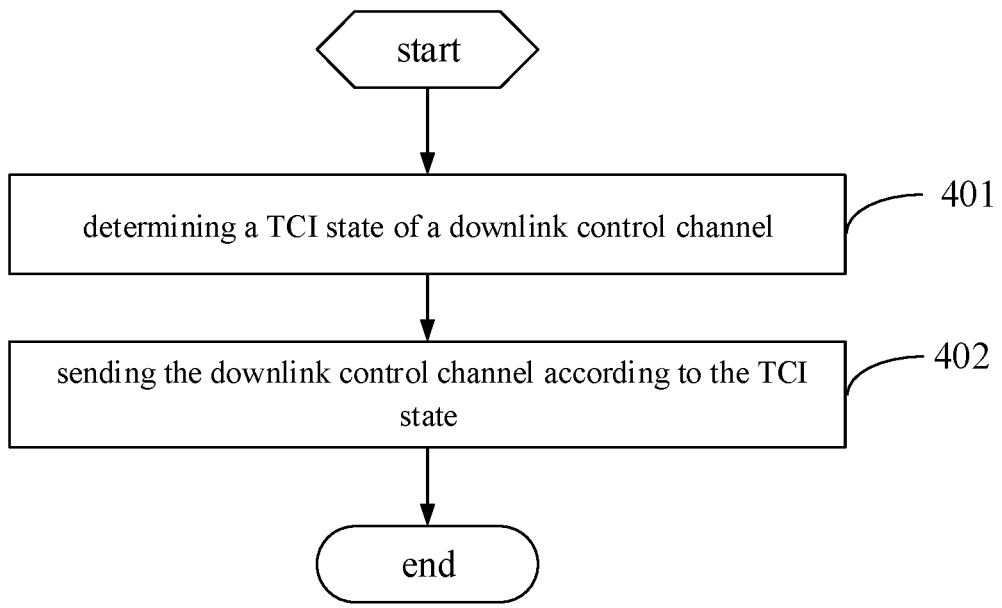
FIG. 4 is a flowchart of a method of sending downlink channel in an embodiment of the present disclosure.

Referring to FIG. 4 which is a flowchart of a method of sending downlink channel in an embodiment of the present disclosure. The method is applied to a base station, as shown in FIG. 4, the method includes the following steps:

Step 401: determining a Transmission Configuration Indication (TCI) state of a downlink control channel, where the TCI state is a TCI state of a control resource set (Control Resource Set, CORESET) last used on an original BWP by the base station, and the downlink control channel is sent on the CORESET of the original BWP; and Step 402: sending the downlink control channel according to the TCI state.

Optionally, before the base station reconfigures, reactivates or re-indicates a second TCI state for the CORESET of the original BWP, the base station uses the first TCI state on the original BWP.

It should be noted that this embodiment is used as an implementation manner of the base station corresponding to the embodiment shown in FIG. 2. For specific implementation manners, please refer to the relevant description of the embodiment shown in FIG. 2, which achieves the same beneficial effects. In order to avoid repetition, details thereof are omitted herein.

Figure 5:
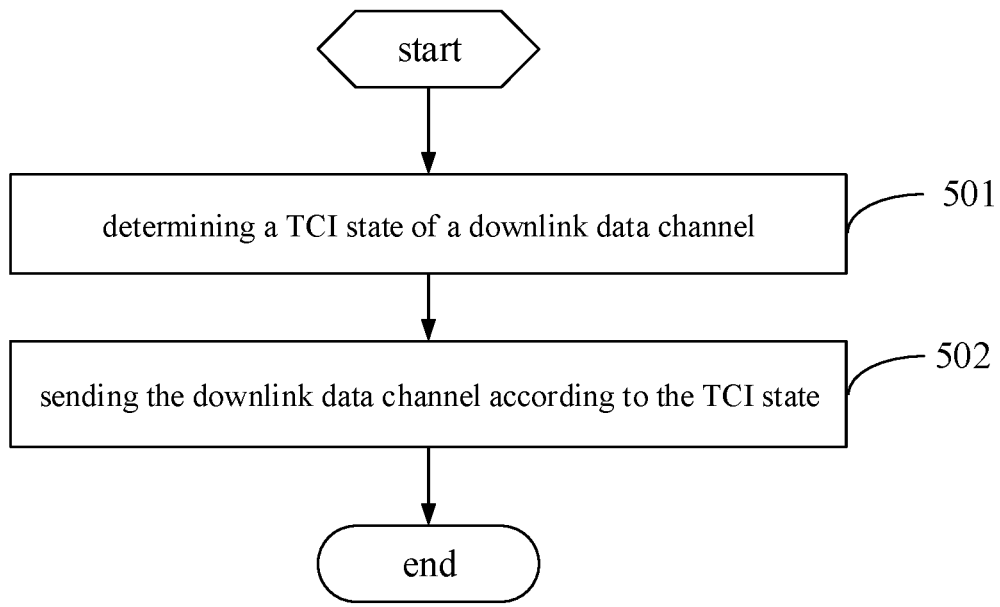
FIG. 5 is a flowchart of another method of sending downlink channel in an embodiment of the present disclosure.

Referring to FIG. 5 which is a flowchart of another downlink channel sending method in an embodiment of the present disclosure. This method is applied to a base station, as shown in FIG. 5, the method includes the following steps:

Step 501: determining a Transmission Configuration Indication (TCI) state of a downlink data channel, where the TCI state is a TCI state of a Control Resource Set (CORESET) or a newly determined TCI state, and the CORESET is a CORESET with a lowest identification in a time domain resource on which Downlink Control Information (DCI) is transmitted, and the DCI is configured to schedule the downlink data channel; and Step 502: sending the downlink data channel according to the TCI state.

Optionally, the sending the downlink data channel according to the TCI state includes:

sending the downlink data channel according to a spatial Quasi-colocation (QCL) parameter indicated by the TCI state.

Optionally, in the case that a scheduling offset of the DCI is smaller than or equal to a preset threshold, the TCI state is the TCI state of the CORESET, and the CORESET is the CORESET with the lowest identification on an active BWP in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification other than a CORESET with identification 0 in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification in CORESETs used for a unicast transmission in the time domain resource.

Optionally, in the case that the DCI includes a TCI field or does not include a TCI field, the TCI state is the TCI state of the CORESET.

Optionally, a downlink control channel or the downlink data channel is sent according to the TCI state with a high priority within a collision period, according to a preset priority rule or a priority rule configured by a base station;

where the collision period includes: an overlapping period between a using period of the TCI state of the downlink data channel and a using period of a TCI state of the current downlink control channel, or an overlapping period between a using period of the TCI state of the downlink data channel and a using period of a TCI state of a current downlink data channel, the TCI state of the current downlink control channel is configured by the base station for sending the downlink control channel, the TCI state of the current downlink data channel is a TCI state for downlink data channel which is indicated by the base station and effective.

Optionally, the preset priority rule or the priority rule configured by the base station includes at least one of:

a priority of the TCI state of the current downlink control channel is higher than a priority of the TCI state of the downlink data channel;

the priority of the TCI state of the current downlink control channel is lower than the priority of the TCI state of the downlink data channel;

a priority of the TCI state of the current downlink data channel is higher than the priority of the TCI state of the downlink data channel;

the priority of the TCI state of the current downlink data channel is lower than the priority of the TCI state of the downlink data channel.

Optionally, at least one of the downlink data channel and a downlink reference signal is sent according to a preset rule or a rule configured by a base station within a collision period;

where the collision period includes: an overlapping period between a using period of the TCI state of the downlink data channel and a using period of a TCI state of the downlink reference signal, the TCI state of the downlink reference signal is configured or indicated by the base station for sending the downlink reference signal.

Optionally, the downlink reference signal includes at least one of a Channel State Information Reference Signal (CSI-RS) and a Synchronization Signal Block (SSB);

the TCI state of the downlink data channel indicates a spatial Quasi-colocation (QCL) parameter for sending the downlink data channel, the TCI state of the downlink reference signal indicates a spatial QCL parameter for sending the downlink reference signal.

Optionally, the preset rule or the rule configured by the base station includes:

within the collision period, the TCI state configured or indicated by the base station for sending the downlink reference signal is the same as the TCI state of the downlink data channel; or within the collision period, the downlink data channel is sent according to the TCI state configured or indicated by the base station for sending the downlink reference signal.

Optionally, prior to the determining the TCI state of the downlink data channel, the method further includes:

determining for a terminal a TCI state of a CORESET with identification 0 through at least one of a configuring manner, an activating manner and an indicating manner, the TCI state is at least configured to indicate an SSB index that has a QCl relationship with the CORESET with identification 0, and the newly determined TCI state is determined by at least one of the configuring manner, the activating manner and the indicating manner.

Optionally, in the case that a scheduling offset of the DCI is smaller than or equal to a preset threshold, the TCI state of the downlink data channel is the newly determined TCI state.

Optionally, the configuring manner refers to configuring through a Radio Resource Control (RRC) signaling;

the activating manner refers to: activating, by a Media Access Control Control Element (MAC CE), one of a plurality of TCI states configured through a RRC signaling; and the indicating manner refers to indicating by an MAC CE or through a physical layer control signaling.

It should be noted that this embodiment is used as an implementation manner of the base station corresponding to the embodiment shown in FIG. 3, and for specific implementation manners, please refer to the related description of the embodiment shown in FIG. 3, which achieve the same beneficial effects. In order to avoid repetition, details thereof are omitted herein.

Figure 6:
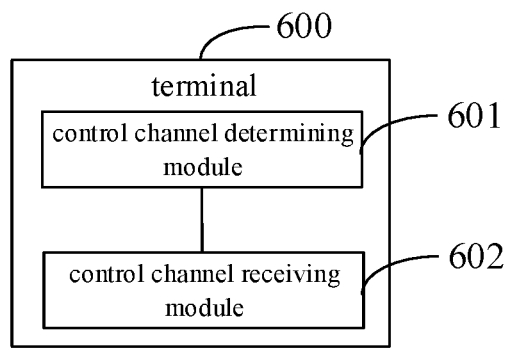
FIG. 6 is a structural view of a terminal in an embodiment of the present disclosure.

Referring to FIG. 6 which is a structural view of a terminal in an embodiment of the present disclosure. As shown in FIG. 6, a terminal 600 includes:

a control channel determining module 601, configured to determine a Transmission Configuration Indication (TCI) state of a downlink control channel, where in the case that the terminal switches back to an original Bandwidth Part (BWP), the TCI state is a TCI state of a Control Resource Set (CORESET) last used on the original BWP by the terminal, and the downlink control channel is sent on the CORESET of the original BWP; and a control channel receiving module 602, configured to receive the downlink control channel according to the TCI state.

Figure 7:
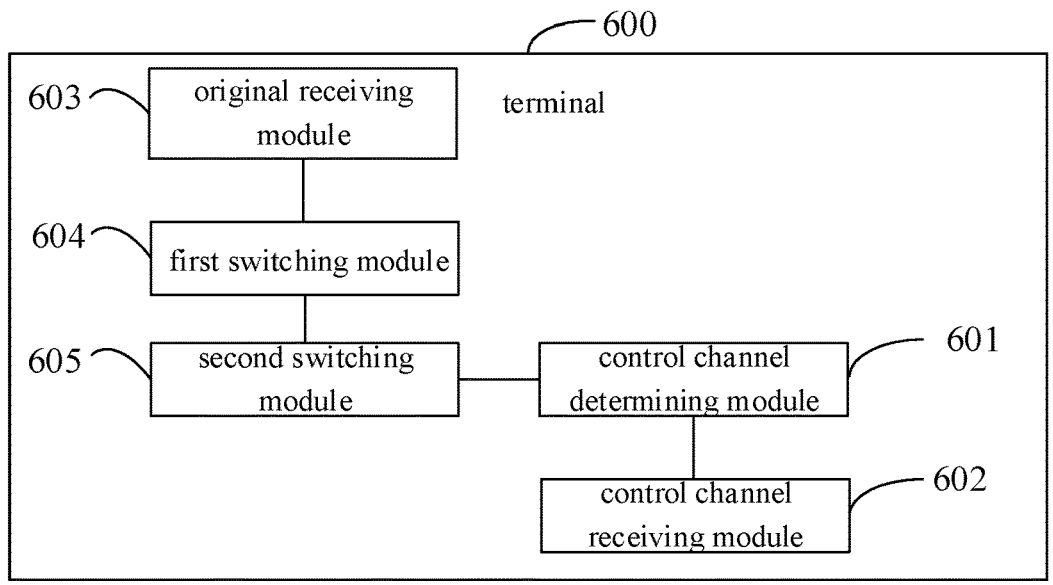
FIG. 7 is a structural view of another terminal in an embodiment of the present disclosure.

Optionally, as shown in FIG. 7, the terminal 600 further includes:

an original receiving module 603, configured to perform a reception according to a first TCI state configured by a base station for the CORESET of the original BWP;

a first switching module 604, configured to switch to another BWP, and performing a reception on the another BWP according to a TCI state configured by the base station for a CORESET of the another BWP; and a second switching module 605, configured to switch from the another BWP to the original BWP, where the TCI state of the CORESET last used on the original BWP is the first TCI state.

Optionally, before the base station reconfigures, reactivates or re-indicates a second TCI state for the CORESET of the original BWP, the terminal uses the first TCI state on the original BWP.

The terminal provided in the embodiment of the present disclosure can implement each process implemented by the terminal in the method embodiment of FIG. 2. To avoid repetition, details are not repeated here, and the reliability and accuracy of data transmission can be improved.

Figure 8:
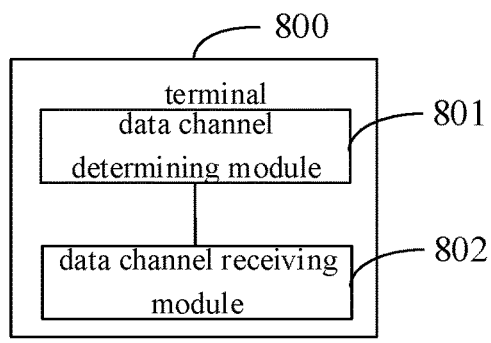
FIG. 8 is a structural view of another terminal in an embodiment of the present disclosure.

Referring to FIG. 8 which is a structural view of another terminal in an embodiment of the present disclosure. As shown in FIG. 8, a terminal 800 includes:

a data channel determining module 801, configured to determine a Transmission Configuration Indication (TCI) state of a downlink data channel, where the TCI state is a TCI state of a Control Resource Set (CORESET) or a newly determined TCI state, and the CORESET is a CORESET with a lowest identification in a time domain resource on which Downlink Control Information (DCI) is transmitted, and the DCI is configured to schedule the downlink data channel; and a data channel receiving module 802, configured to receive the downlink data channel according to the TCI state.

Optionally, the data channel receiving module 802 is further configured to receive the downlink data channel according to a spatial Quasi-colocation (QCL) parameter indicated by the TCI state.

Optionally, in the case that a scheduling offset of the DCI is smaller than or equal to a preset threshold, the TCI state is the TCI state of the CORESET, and the CORESET is the CORESET with the lowest identification on an active BWP in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification other than a CORESET with identification 0 in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification in CORESETs used for a unicast transmission in the time domain resource.

Optionally, in the case that the DCI includes a TCI field or does not include a TCI field, the TCI state is the TCI state of the CORESET.

Optionally, a receiving of a downlink control channel or the downlink data channel is performed according to the TCI state with a high priority within a collision period, according to a preset priority rule or a priority rule configured by a base station;

where the collision period includes: an overlapping period between a using period of the TCI state of the downlink data channel and a using period of a TCI state for the current receiving of downlink control channel, or an overlapping period between a using period of the TCI state of the downlink data channel and a using period of a TCI state of a current downlink data channel, the TCI state for the current receiving of downlink control channel is configured by the base station for receiving the downlink control channel, the TCI state of the current downlink data channel is a TCI state for downlink data channel which is indicated by the base station and effective.

Optionally, the preset priority rule or the priority rule configured by the base station includes at least one of:

a priority of the TCI state for the current receiving of downlink control channel is higher than a priority of the TCI state of the downlink data channel;

the priority of the TCI state for the current receiving of downlink control channel is lower than the priority of the TCI state of the downlink data channel;

a priority of the TCI state of the current downlink data channel is higher than the priority of the TCI state of the downlink data channel;

the priority of the TCI state of the current downlink data channel is lower than the priority of the TCI state of the downlink data channel.

Optionally, at least one of the downlink data channel and a downlink reference signal is received according to a preset rule or a rule configured by a base station within a collision period;

where the collision period includes: an overlapping period between a using period of the TCI state of the downlink data channel and a using period of a TCI state of the downlink reference signal, the TCI state of the downlink reference signal is configured or indicated by the base station for receiving the downlink reference signal.

Optionally, the downlink reference signal includes at least one of a Channel State Information Reference Signal (CSI-RS) and a Synchronization Signal Block (SSB);

the TCI state of the downlink data channel indicates a spatial Quasi-colocation (QCL) parameter for receiving the downlink data channel, the TCI state of the downlink reference signal indicates a spatial QCL parameter for receiving the downlink reference signal.

Optionally, the preset rule or the rule configured by the base station includes:

within the collision period, the TCI state configured or indicated by the base station for receiving the downlink reference signal is the same as the TCI state of the downlink data channel; or within the collision period, the downlink data channel is received according to the TCI state configured or indicated by the base station for receiving the downlink reference signal.

Figure 9:
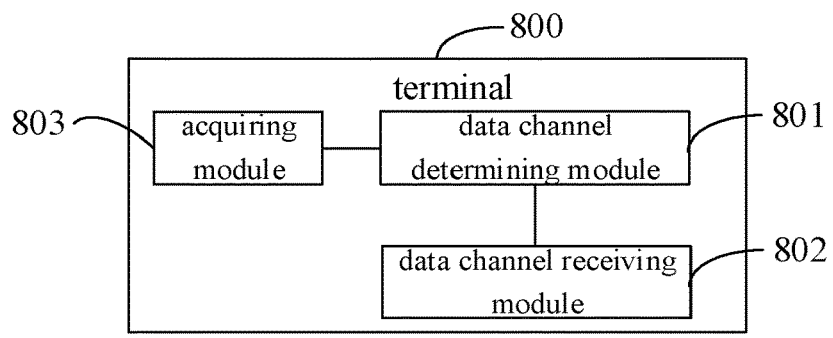
FIG. 9 is a structural view of another terminal in an embodiment of the present disclosure.

As shown in FIG. 9, the terminal 800 further includes:

an acquiring module 803, configured to acquire a TCI state which is determined by a base station for a CORESET with identification 0 through at least one of a configuring manner, an activating manner and an indicating manner, where the TCI state is at least configured to indicate an SSB index that has a QCI relationship with the CORESET with identification 0, and the newly determined TCI state is determined by at least one of the configuring manner, the activating manner and the indicating manner.

Optionally, in the case that a scheduling offset of the DCI is smaller than or equal to a preset threshold, the TCI state of the downlink data channel is the newly determined TCI state.

Optionally, the configuring manner refers to configuring through a Radio Resource Control (RRC) signaling;

the activating manner refers to: activating, by a Media Access Control Control Element (MAC CE), one of a plurality of TCI states configured through a RRC signaling; and the indicating manner refers to indicating by an MAC CE or through a physical layer control signaling.

The terminal provided by the embodiment of the present disclosure can implement each process implemented by the terminal in the method embodiment of FIG. 3, and in order to avoid repetition, the details are not repeated here, and the reliability and accuracy of data transmission can be improved.

Figure 10:
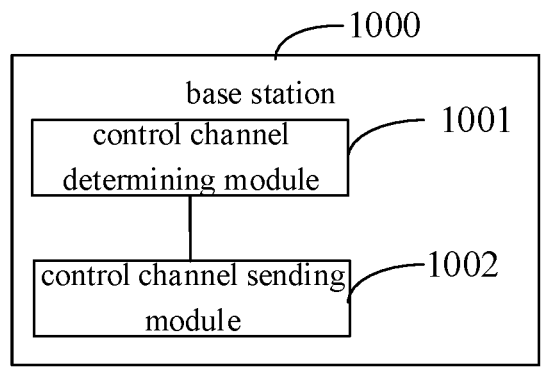
FIG. 10 is a structural view of a base station in an embodiment of the present disclosure.

Referring to FIG. 10 which is a structural view of a base station in an embodiment of the present disclosure. As shown in FIG. 10, a base station 1000 includes:

a control channel determining module 1001, configured to determine a Transmission Configuration Indication (TCI) state of a downlink control channel, where the TCI state is a TCI state of a Control Resource Set (CORESET) last used on an original BWP by the base station, and the downlink control channel is sent on the CORESET of the original BWP; and a control channel sending module 1002, configured to send the downlink control channel according to the TCI state.

Optionally, before the base station reconfigures, reactivates or re-indicates a second TCI state for the CORESET of the original BWP, the terminal uses the first TCI state on the original BWP.

The base station provided in the embodiment of the present disclosure can implement each process implemented by the base station in the method embodiment of FIG. 4, and in order to avoid repetition, the details are not repeated here, and the reliability and accuracy of data transmission can be improved.

Figure 11:
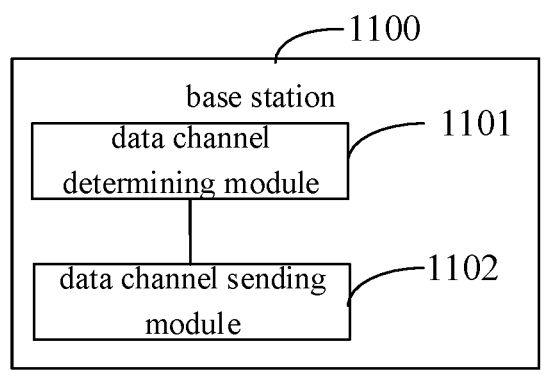
FIG. 11 is a structural view of another base station in an embodiment of the present disclosure.

Referring to FIG. 11 which is a structural view of a base station in an embodiment of the present disclosure. As shown in FIG. 11, a base station 1100 includes:

a data channel determining module 1101, configured to determine a Transmission Configuration Indication (TCI) state of a downlink data channel, where the TCI state is a TCI state of a Control Resource Set (CORESET) or a newly determined TCI state, and the CORESET is a CORESET with a lowest identification in a time domain resource on which Downlink Control Information (DCI) is transmitted, and the DCI is configured to schedule the downlink data channel;

a data channel sending module 1102, configured to send the downlink data channel according to the TCI state Optionally, the data channel sending module 1102 is further configured to send the downlink data channel according to a spatial Quasi-colocation (QCL) parameter indicated by the TCI state.

Optionally, in the case that a scheduling offset of the DCI is smaller than or equal to a preset threshold, the TCI state is the TCI state of the CORESET, and the CORESET is the CORESET with the lowest identification on an active BWP in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification other than a CORESET with identification 0 in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification in CORESETs used for a unicast transmission in the time domain resource.

Optionally, in the case that the DCI includes a TCI field or does not include a TCI field, the TCI state is the TCI state of the CORESET.

Optionally, a downlink control channel or the downlink data channel is sent according to the TCI state with a high priority within a collision period, according to a preset priority rule or a priority rule configured by a base station;

where the collision period includes: an overlapping period between a using period of the TCI state of the downlink data channel and a using period of a TCI state of the current downlink control channel, or an overlapping period between a using period of the TCI state of the downlink data channel and a using period of a TCI state of a current downlink data channel, the TCI state of the current downlink control channel is configured by the base station for sending the downlink control channel, the TCI state of the current downlink data channel is a TCI state for downlink data channel which is indicated by the base station and effective.

Optionally, the preset priority rule or the priority rule configured by the base station includes at least one of:

a priority of the TCI state of the current downlink control channel is higher than a priority of the TCI state of the downlink data channel;

the priority of the TCI state of the current downlink control channel is lower than the priority of the TCI state of the downlink data channel;

a priority of the TCI state of the current downlink data channel is higher than the priority of the TCI state of the downlink data channel;

the priority of the TCI state of the current downlink data channel is lower than the priority of the TCI state of the downlink data channel.

Optionally, at least one of the downlink data channel and a downlink reference signal is sent according to a preset rule or a rule configured by a base station within a collision period;

where the collision period includes: an overlapping period between a using period of the TCI state of the downlink data channel and a using period of a TCI state of the downlink reference signal, the TCI state of the downlink reference signal is configured or indicated by the base station for sending the downlink reference signal.

Optionally, the downlink reference signal includes at least one of a Channel State Information Reference Signal (CSI-RS) and a Synchronization Signal Block (SSB);

the TCI state of the downlink data channel indicates a spatial Quasi-colocation (QCL) parameter for sending the downlink data channel, the TCI state of the downlink reference signal indicates a spatial QCL parameter for sending the downlink reference signal.

Optionally, the preset rule or the rule configured by the base station includes:

within the collision period, the TCI state configured or indicated by the base station for sending the downlink reference signal is the same as the TCI state of the downlink data channel; or within the collision period, the downlink data channel is sent according to the TCI state configured or indicated by the base station for sending the downlink reference signal.

Figure 12:
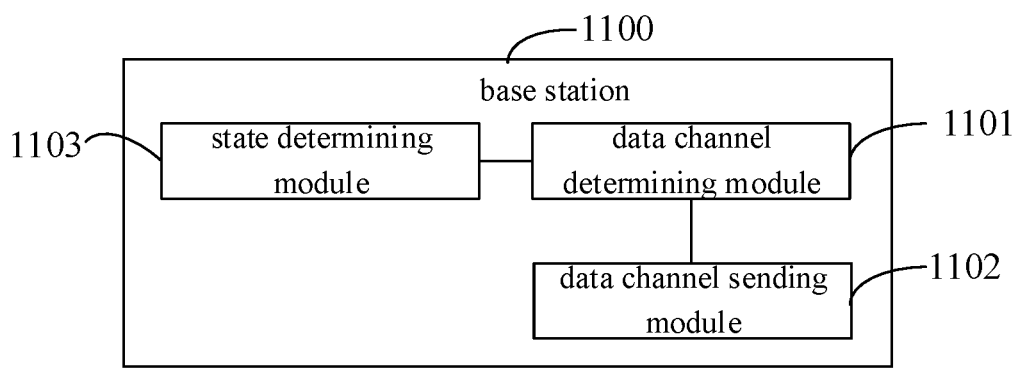
FIG. 12 is a structural view of another base station in an embodiment of the present disclosure.

As shown in FIG. 12, the base station 1100 further includes:

a state determining module 1103, configured to determine for a terminal a TCI state of a CORESET with identification 0 through at least one of a configuring manner, an activating manner and an indicating manner, the TCI state is at least configured to indicate an SSB index that has a QCI relationship with the CORESET with identification 0, and the newly determined TCI state is determined by at least one of the configuring manner, the activating manner and the indicating manner.

Optionally, in the case that a scheduling offset of the DCI is smaller than or equal to a preset threshold, the TCI state of the downlink data channel is the newly determined TCI state.

Optionally, the configuring manner refers to configuring through a Radio Resource Control (RRC) signaling;

the activating manner refers to: activating, by a Media Access Control Control Element (MAC CE), one of a plurality of TCI states configured through a RRC signaling; and the indicating manner refers to indicating by an MAC CE or through a physical layer control signaling.

The base station provided in the embodiment of the present disclosure can implement each process implemented by the terminal in the method embodiment of FIG. 3, and in order to avoid repetition, the details are not repeated here, and the reliability and accuracy of data transmission can be improved.

Figure 13:
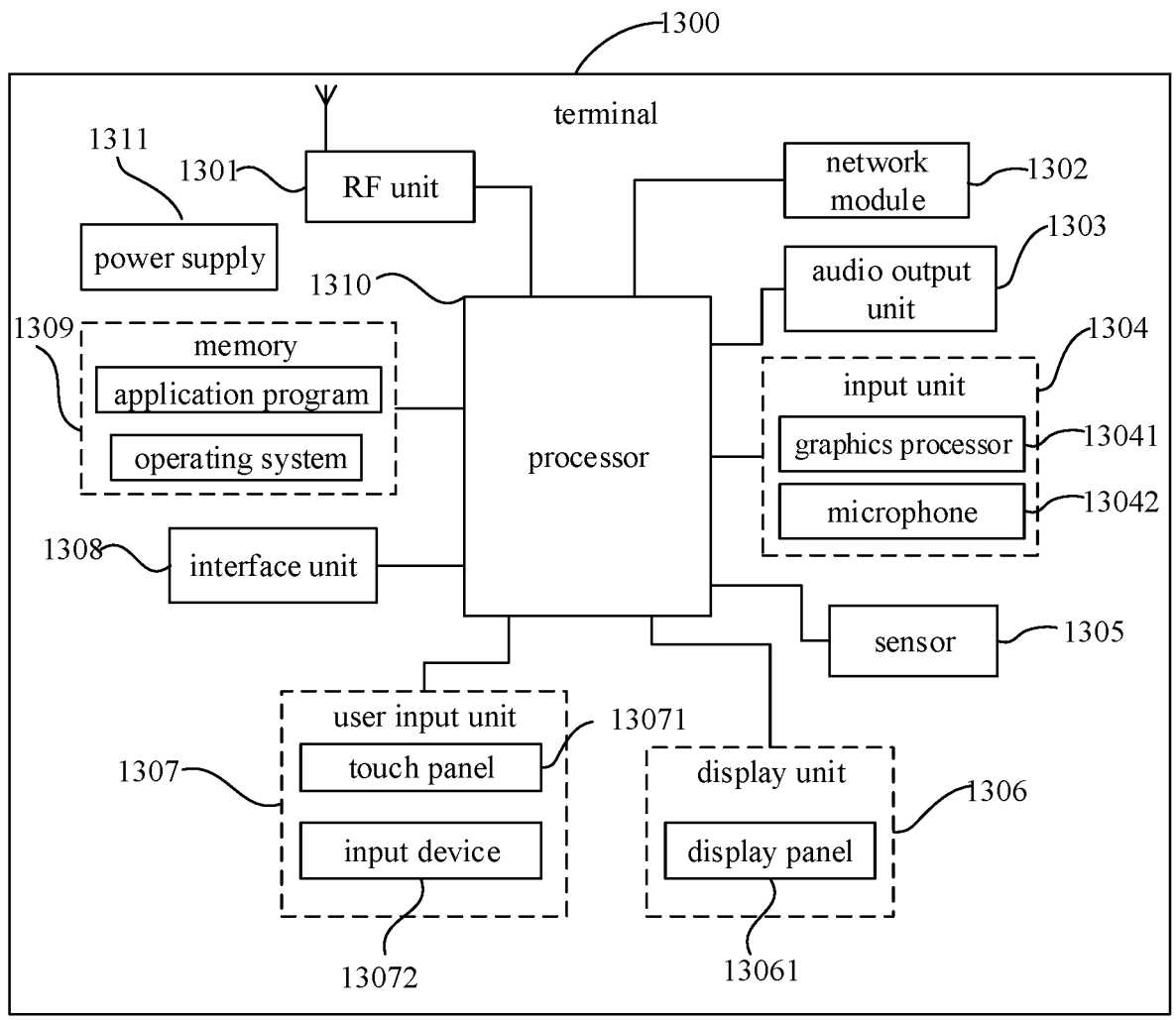
FIG. 13 is a structural view of another terminal in an embodiment of the present disclosure.

FIG. 13 is a schematic diagram of the hardware structure of a terminal that implements the embodiments of the present disclosure.

The terminal 1300 includes but is not limited to: a radio frequency unit 1301, a network module 1302, an audio output unit 1303, an input unit 1304, a sensor 1305, a display unit 1306, a user input unit 1307, an interface unit 1308, a memory 1309, a processor 1310, and a power supply 1311 and other components. Those skilled in the art can understand that the terminal structure shown in FIG. 13 does not constitute a limitation on the terminal, and the terminal may include more or fewer components than shown in the figure, or combine certain components, or arrange different components. In the embodiments of the present disclosure, terminals include, but are not limited to, mobile phones, tablet computers, notebook computers, palmtop computers, vehicle-mounted terminals, wearable devices, and pedometers.

The processor 1310 is configured to determine a Transmission Configuration Indication (TCI) state of a downlink control channel, where in the case that the terminal switches back to an original Bandwidth Part (BWP), the TCI state is a TCI state of a Control Resource Set (CORESET) last used on the original BWP by the terminal, and the downlink control channel is sent on the CORESET of the original BWP.

The radio frequency unit 1301 is configured to receive the downlink control channel according to the TCI state.

Optionally, prior to the determining the TCI state of the downlink control channel, the radio frequency unit 1301 is further configured to:

perform a reception according to a first TCI state configured by a base station for the CORESET of the original BWP;

switch to another BWP, and performing a reception on the another BWP according to a TCI state configured by the base station for a CORESET of the another BWP; and switch from the another BWP to the original BWP, where the TCI state of the CORESET last used on the original BWP is the first TCI state.

Optionally, before the base station reconfigures, reactivates or re-indicates a second TCI state for the CORESET of the original BWP, the terminal uses the first TCI state on the original BWP. The aforementioned terminal may improve the reliability and accuracy of data transmission.

It should be understood that, in the embodiment of the present disclosure, the radio frequency unit 1301 may be used for receiving and sending signals in the process of sending and receiving information or talking. Specifically, the downlink data from the base station is received and processed by the processor 1310; in addition, Uplink data is sent to the base station. Generally, the radio frequency unit 1301 includes, but is not limited to, an antenna, at least one amplifier, a transceiver, a coupler, a low noise amplifier, a duplexer, and the like. In addition, the radio frequency unit 1301 can also communicate with the network and other devices through a wireless communication system.

The terminal provides users with wireless broadband Internet access through the network module 1302, such as helping users to send and receive emails, browse web pages, and access streaming media.

The audio output unit 1303 may convert the audio data received by the radio frequency unit 1301 or the network module 1302 or stored in the memory 1309 into audio signals and output them as sounds. Moreover, the audio output unit 1303 may also provide audio output related to a specific function performed by the terminal 1300 (for example, call signal reception sound, message reception sound, etc.). The audio output unit 1303 includes a speaker, a buzzer, a receiver, and the like.

The input unit 1304 is used to receive audio or video signals. The input unit 1304 may include a graphics processing unit (GPU) 13041 and a microphone 13042. The graphics processor 13041 is configured to respond to images of still pictures or videos obtained by an image capture device (such as a camera) in the video capture mode or the image capture mode. The processed image frame can be displayed on the display unit 1306. The image frame processed by the graphics processor 13041 may be stored in the memory 1309 (or other storage medium) or sent via the radio frequency unit 1301 or the network module 1302. The microphone 13042 can receive sound, and can process such sound into audio data. The processed audio data can be converted into a format that can be sent to a mobile communication base station via the radio frequency unit 1301 in the case of a telephone call mode for output.

The terminal 1300 further includes at least one sensor 1305, such as a light sensor, a motion sensor, and other sensors. Specifically, the light sensor includes an ambient light sensor and a proximity sensor. The ambient light sensor can adjust the brightness of the display panel 13061 according to the brightness of the ambient light. The proximity sensor can close the display panel 13061 and/or the backlight when the terminal 1300 is moved to the ear. As a kind of motion sensor, the accelerometer sensor can detect the magnitude of acceleration in various directions (usually three-axis), and can detect the magnitude and direction of gravity when stationary, and can be used to identify terminal posture (such as horizontal and vertical screen switching, related games, Magnetometer attitude calibration), vibration recognition related functions (such as pedometer, percussion), etc.; sensors 1305 can also include fingerprint sensors, pressure sensors, iris sensors, molecular sensors, gyroscopes, barometers, hygrometers, thermometers, infrared Sensors, etc., will not be repeated here.

The display unit 1306 is used to display information input by the user or information provided to the user. The display unit 1306 may include a display panel 13061, and the display panel 13061 may be configured in the form of a liquid crystal display (LCD), an organic light-emitting diode (OLED), etc.

The user input unit 1307 may be used to receive inputted number or character information, and generate key signal input related to user settings and function control of the terminal. Specifically, the user input unit 1307 includes a touch panel 13071 and other input devices 13072. The touch panel 13071, also called a touch screen, can collect user touch operations on or near it (for example, the user uses any suitable objects or accessories such as fingers, stylus, etc.) on the touch panel 13071 or near the touch panel 13071. The touch panel 13071 may include two parts, a touch detection device and a touch controller. Among them, the touch detection device detects the user's touch position, and detects the signal brought by the touch operation, and transmits the signal to the touch controller; the touch controller receives the touch information from the touch detection device, converts it into contact coordinates, and then sends it The processor 1310 receives and executes the command sent by the processor 1310. In addition, the touch panel 13071 can be implemented in multiple types such as resistive, capacitive, infrared, and surface acoustic wave. In addition to the touch panel 13071, the user input unit 1307 may also include other input devices 13072. Specifically, other input devices 13072 may include, but are not limited to, a physical keyboard, function keys (such as volume control buttons, switch buttons, etc.), trackball, mouse, and joystick, which will not be repeated here.

Further, the touch panel 13071 may cover the display panel 13061. When the touch panel 13071 detects a touch operation on or near it, it transmits it to the processor 1310 to determine the type of the touch event, and then the processor 1310 determines the type of the touch event according to the touch. The type of event provides corresponding visual output on the display panel 13061. Although in FIG. 13, the touch panel 13071 and the display panel 13061 are used as two independent components to realize the input and output functions of the terminal, in some embodiments, the touch panel 13071 and the display panel 13061 may be integrated to realize the input and output functions of the terminal, which are not limited here.

The interface unit 1308 is an interface for connecting an external device with the terminal 1300. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 1308 may be used to receive input (for example, data information, power, etc.) from an external device and transmit the received input to one or more elements in the terminal 1300 or may be used to communicate between the terminal 1300 and the external device. Transfer data between.

The memory 1309 can be used to store software programs and various data. The memory 1309 may mainly include a storage program area and a storage data area. The storage program area may store an operating system, an application program required by at least one function (such as a sound playback function, an image playback function, etc.), etc.; the storage data area may store data (such as audio data, phone book, etc.) created by using the mobile phones. In addition, the memory 1309 may include a high-speed random access memory, and may also include a non-volatile memory, such as at least one magnetic disk storage device, a flash memory device, or other volatile solid-state storage devices.

The processor 1310 is the control center of the terminal. It uses various interfaces and lines to connect various parts of the entire terminal. It executes by running or executing software programs and/or modules stored in the memory 1309, and calling data stored in the memory 1309. Various functions of the terminal and processing data, so as to monitor the terminal as a whole. The processor 1310 may include one or more processing units; optionally, the processor 1310 may integrate an application processor and a modem processor, where the application processor mainly processes the operating system, user interface and application programs, etc. The adjustment processor mainly deals with wireless communication. It can be understood that the foregoing modem processor may not be integrated into the processor 1310.

The terminal 1300 may also include a power source 1311 (such as a battery) for supplying power to various components. Optionally, the power source 1311 may be logically connected to the processor 1310 through a power management system, so as to manage charging, discharging, and power consumption management through the power management system and other functions.

In addition, the terminal 1300 includes some functional modules not shown, which will not be repeated here.

Optionally, an embodiment of the present disclosure further provides a terminal, including a processor 1310, a memory 1309, and a computer program stored in the memory 1309 and executable on the processor 1310. When the computer program is executed by the processor 1310, each process of the foregoing embodiment of the method of receiving downlink channel is implemented, and the same technical effect can be achieved. To avoid repetition, details are not repeated here.

Figure 14:
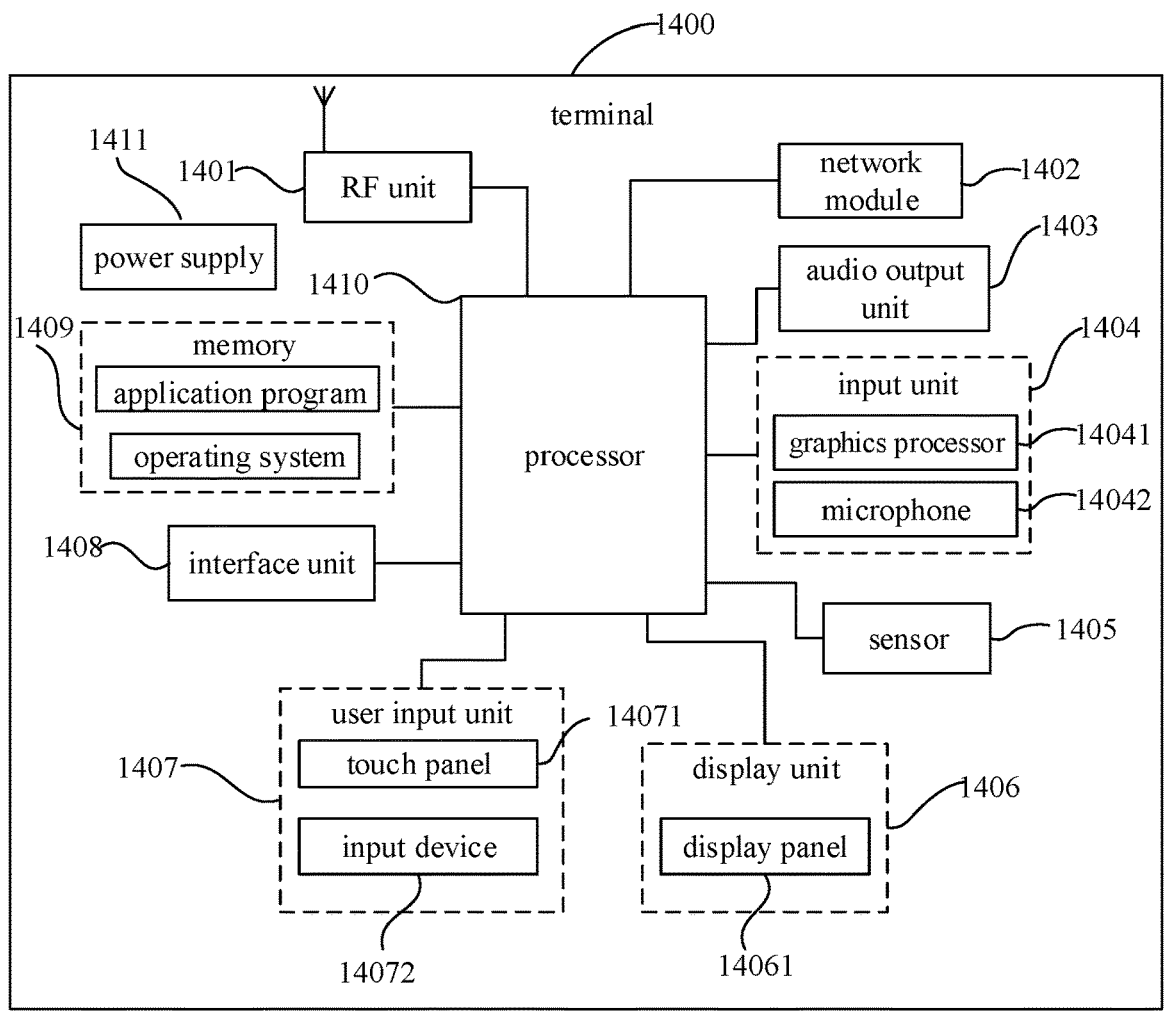
FIG. 14 is a structural view of another terminal in an embodiment of the present disclosure.

FIG. 14 is a schematic diagram of a hardware structure of a terminal that implements various embodiments of the present disclosure.

The terminal 1400 includes but is not limited to: a radio frequency unit 1401, a network module 1402, an audio output unit 1403, an input unit 1404, a sensor 1405, a display unit 1406, a user input unit 1407, an interface unit 1408, a memory 1409, a processor 1410, and a power supply 1411 and other parts. Those skilled in the art can understand that the terminal structure shown in FIG. 14 does not constitute a limitation on the terminal, and the terminal may include more or fewer components than shown in the figure, or combine certain components, or arrange different components. In the embodiments of the present disclosure, terminals include, but are not limited to, mobile phones, tablet computers, notebook computers, palmtop computers, vehicle-mounted terminals, wearable devices, and pedometers.

The processor 1410 is configured to determine a Transmission Configuration Indication (TCI) state of a downlink data channel, where the TCI state is a TCI state of a Control Resource Set (CORESET) or a newly determined TCI state, and the CORESET is a CORESET with a lowest identification in a time domain resource on which Downlink Control Information (DCI) is transmitted, and the DCI is configured to schedule the downlink data channel.

The radio frequency unit 1401 is configured to receive the downlink data channel according to the TCI state.

Optionally, the data channel receiving module 802 is further configured to receive the downlink data channel according to a spatial Quasi-colocation (QCL) parameter indicated by the TCI state.

Optionally, in the case that a scheduling offset of the DCI is smaller than or equal to a preset threshold, the TCI state is the TCI state of the CORESET, and the CORESET is the CORESET with the lowest identification on an active BWP in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification other than a CORESET with identification 0 in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification in CORESETs used for a unicast transmission in the time domain resource.

Optionally, in the case that the DCI includes a TCI field or does not include a TCI field, the TCI state is the TCI state of the CORESET.

Optionally, a receiving of a downlink control channel or the downlink data channel is performed according to the TCI state with a high priority within a collision period, according to a preset priority rule or a priority rule configured by a base station;

where the collision period includes: an overlapping period between a using period of the TCI state of the downlink data channel and a using period of a TCI state for the current receiving of downlink control channel, or an overlapping period between a using period of the TCI state of the downlink data channel and a using period of a TCI state of a current downlink data channel, the TCI state for the current receiving of downlink control channel is configured by the base station for receiving the downlink control channel, the TCI state of the current downlink data channel is a TCI state for downlink data channel which is indicated by the base station and effective.

Optionally, the preset priority rule or the priority rule configured by the base station includes at least one of:

a priority of the TCI state for the current receiving of downlink control channel is higher than a priority of the TCI state of the downlink data channel;

the priority of the TCI state for the current receiving of downlink control channel is lower than the priority of the TCI state of the downlink data channel;

a priority of the TCI state of the current downlink data channel is higher than the priority of the TCI state of the downlink data channel;

the priority of the TCI state of the current downlink data channel is lower than the priority of the TCI state of the downlink data channel.

Optionally, at least one of the downlink data channel and a downlink reference signal is received according to a preset rule or a rule configured by a base station within a collision period;

where the collision period includes: an overlapping period between a using period of the TCI state of the downlink data channel and a using period of a TCI state of the downlink reference signal, the TCI state of the downlink reference signal is configured or indicated by the base station for receiving the downlink reference signal.

Optionally, the downlink reference signal includes at least one of a Channel State Information Reference Signal (CSI-RS) and a Synchronization Signal Block (SSB);

the TCI state of the downlink data channel indicates a spatial Quasi-colocation (QCL) parameter for receiving the downlink data channel, the TCI state of the downlink reference signal indicates a spatial QCL parameter for receiving the downlink reference signal.

Optionally, the preset rule or the rule configured by the base station includes:

within the collision period, the TCI state configured or indicated by the base station for receiving the downlink reference signal is the same as the TCI state of the downlink data channel; or within the collision period, the downlink data channel is received according to the TCI state configured or indicated by the base station for receiving the downlink reference signal.

Optionally, before determining the TCI state of the downlink channel, the radio frequency unit 1401 is further configured to acquire a TCI state which is determined by a base station for a CORESET with identification 0 through at least one of a configuring manner, an activating manner and an indicating manner, where the TCI state is at least configured to indicate an SSB index that has a QCI relationship with the CORESET with identification 0, and the newly determined TCI state is determined by at least one of the configuring manner, the activating manner and the indicating manner.

Optionally, in the case that a scheduling offset of the DCI is smaller than or equal to a preset threshold, the TCI state of the downlink data channel is the newly determined TCI state.

Optionally, the configuring manner refers to configuring through a Radio Resource Control (RRC) signaling;

the activating manner refers to: activating, by a Media Access Control Control Element (MAC CE), one of a plurality of TCI states configured through a RRC signaling; and the indicating manner refers to indicating by an MAC CE or through a physical layer control signaling.

According to the terminal in the embodiments of the present disclosure, the reliability and accuracy of data transmission can be improved It should be understood that, in the embodiment of the present disclosure, the radio frequency unit 1401 can be used for receiving and sending signals in the process of sending and receiving information or talking. Specifically, the downlink data from the base station is received and processed by the processor 1410; in addition, Uplink data is sent to the base station. Generally, the radio frequency unit 1401 includes, but is not limited to, an antenna, at least one amplifier, a transceiver, a coupler, a low noise amplifier, a duplexer, and the like.

In addition, the radio frequency unit 1401 can also communicate with the network and other devices through a wireless communication system.

The terminal provides users with wireless broadband Internet access through the network module 1402, such as helping users to send and receive emails, browse web pages, and access streaming media.

The audio output unit 1403 may convert the audio data received by the radio frequency unit 1401 or the network module 1402 or stored in the memory 1409 into audio signals and output them as sounds. Moreover, the audio output unit 1403 may also provide audio output related to a specific function performed by the terminal 1400 (for example, call signal reception sound, message reception sound, etc.). The audio output unit 1403 includes a speaker, a buzzer, a receiver, and the like.

The input unit 1404 is used to receive audio or video signals. The input unit 1404 may include a graphics processing unit (GPU) 14041 and a microphone 14042, and the graphics processor 14041 is configured to respond to images of still pictures or videos obtained by an image capture device (such as a camera) in a video capture mode or an image capture mode. The processed image frame can be displayed on the display unit 1406. The image frame processed by the graphics processor 14041 may be stored in the memory 1409 (or other storage medium) or sent via the radio frequency unit 1401 or the network module 1402. The microphone 14042 can receive sound, and can process such sound into audio data. The processed audio data can be converted into a format that can be sent to the mobile communication base station via the radio frequency unit 1401 for output in the case of a telephone call mode.

The terminal 1400 further includes at least one sensor 1405, such as a light sensor, a motion sensor, and other sensors. Specifically, the light sensor includes an ambient light sensor and a proximity sensor. The ambient light sensor can adjust the brightness of the display panel 14061 according to the brightness of the ambient light. The proximity sensor can close the display panel 14061 and/or backlight when the terminal 1400 is moved to the ear. As a kind of motion sensor, the accelerometer sensor can detect the magnitude of acceleration in various directions (usually three axes), and can detect the magnitude and direction of gravity when stationary, and can be used to identify terminal posture (such as horizontal and vertical screen switching, related games, Magnetometer attitude calibration), vibration recognition related functions (such as pedometer, percussion), etc.; sensor 1405 can also include fingerprint sensor, pressure sensor, iris sensor, molecular sensor, gyroscope, barometer, hygrometer, thermometer, infrared Sensors, etc., will not be repeated here.

The display unit 1406 is used to display information input by the user or information provided to the user. The display unit 1406 may include a display panel 14061, and the display panel 14061 may be configured in the form of a liquid crystal display (Liquid Crystal Display, LCD), an organic light emitting diode (Organic Light-Emitting Diode, OLED), etc.

The user input unit 1407 can be used to receive inputted number or character information, and generate key signal input related to user settings and function control of the terminal. Specifically, the user input unit 1407 includes a touch panel 14071 and other input devices 14072. The touch panel 14071, also known as a touch screen, can collect user touch operations on or near it (for example, the user uses any suitable objects or accessories such as fingers, stylus, etc.) on the touch panel 14071 or near the touch panel 14071. The touch panel 14071 may include two parts, a touch detection device and a touch controller. Among them, the touch detection device detects the user's touch position, and detects the signal brought by the touch operation, and transmits the signal to the touch controller; the touch controller receives the touch information from the touch detection device, converts it into contact coordinates, and then sends it The processor 1410 receives and executes the command sent by the processor 1410. In addition, the touch panel 14071 can be implemented in multiple types such as resistive, capacitive, infrared, and surface acoustic wave. In addition to the touch panel 14071, the user input unit 1407 may also include other input devices 14072. Specifically, other input devices 14072 may include, but are not limited to, a physical keyboard, function keys (such as volume control buttons, switch buttons, etc.), trackball, mouse, and joystick, which will not be repeated here.

Further, the touch panel 14071 can cover the display panel 14061. When the touch panel 14071 detects a touch operation on or near it, it is transmitted to the processor 1410 to determine the type of the touch event, and then the processor 1410 determines the type of touch event according to the touch. The type of event provides corresponding visual output on the display panel 14061. Although in FIG. 14, the touch panel 14071 and the display panel 14061 are used as two independent components to realize the input and output functions of the terminal, in some embodiments, the touch panel 14071 and the display panel 14061 may be integrated. Realize the input and output functions of the terminal, which are not limited here.

The interface unit 1408 is an interface for connecting an external device with the terminal 1400. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 1408 may be used to receive input (for example, data information, power, etc.) from an external device and transmit the received input to one or more elements in the terminal 1400 or may be used to communicate between the terminal 1400 and the external device. Transfer data between.

The memory 1409 can be used to store software programs and various data. The memory 1409 may mainly include a program storage area and a data storage area. The program storage area may store an operating system, an application program required by at least one function (such as a sound playback function, an image playback function, etc.), etc.; the data storage area may store data (such as audio data, phone book, etc.) created by the use of mobile phones. In addition, the memory 1409 may include a high-speed random access memory, and may also include a non-volatile memory, such as at least one magnetic disk storage device, a flash memory device, or other volatile solid-state storage devices.

The processor 1410 is the control center of the terminal. It uses various interfaces and lines to connect the various parts of the entire terminal. It executes by running or executing software programs and/or modules stored in the memory 1409, and calling data stored in the memory 1409. Various functions of the terminal and processing data, so as to monitor the terminal as a whole. The processor 1410 may include one or more processing units; optionally, the processor 1410 may integrate an application processor and a modem processor. The application processor mainly processes the operating system, user interface, and application programs, etc. The adjustment processor mainly deals with wireless communication. It can be understood that the foregoing modem processor may not be integrated into the processor 1410.

The terminal 1400 may also include a power supply 1411 (such as a battery) for supplying power to various components. Optionally, the power supply 1411 may be logically connected to the processor 1410 through a power management system, so as to manage charging, discharging, and power consumption management through the power management system. And other functions.

In addition, the terminal 1400 includes some functional modules not shown, which will not be repeated here.

Optionally, a terminal is further provided in an embodiment of the present disclosure, including a processor 1410, a memory 1409, and a computer program stored in the memory 1409 and running on the processor 1410. When the computer program is executed by the processor 1410, each process of the foregoing embodiment of the method of receiving downlink channel is implemented, and the same technical effect can be achieved. To avoid repetition, details are not repeated here.

Figure 15:
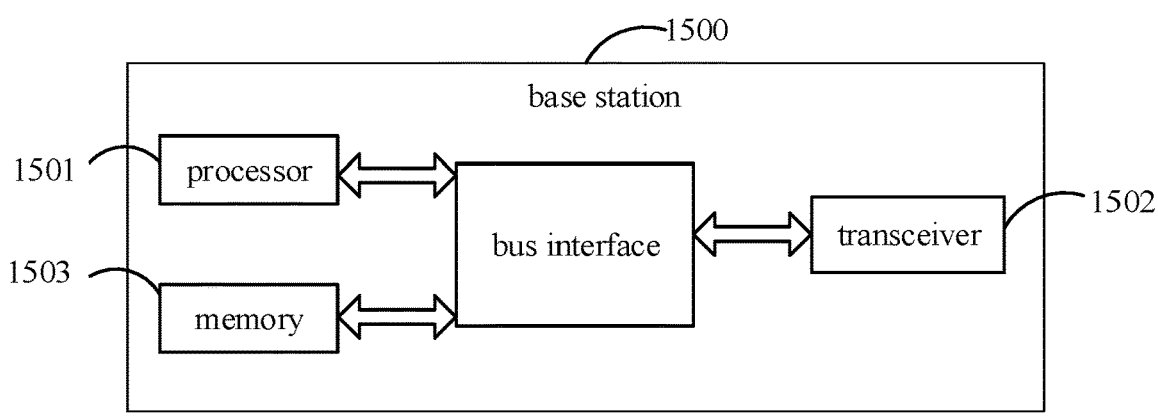
FIG. 15 is a structural view of another base station in an embodiment of the present disclosure.

Referring to FIG. 15 which is a structural view of another base station in an embodiment of the present disclosure. As shown in FIG. 15, the base station 1500 includes: a processor 1501, a transceiver 1502, a memory 1503, and a bus interface, where:

The processor 1501 is configured to determine a Transmission Configuration Indication (TCI) state of a downlink control channel, where the TCI state is a TCI state of a Control Resource Set (CORESET) last used on an original BWP by the base station, and the downlink control channel is sent on the CORESET of the original BWP.

The transceiver 1502 is configured to send the downlink control channel according to the TCI state.

Optionally, before the base station reconfigures, reactivates or re-indicates a second TCI state for the CORESET of the original BWP, the base station uses the first TCI state on the original BWP.

The aforementioned base station can improve the reliability and accuracy of data transmission.

The transceiver 1502 is configured to receive and send data under the control of the processor 1501, and the transceiver 1502 includes at least two antenna ports.

In FIG. 15, the bus architecture may include any number of interconnected buses and bridges. Specifically, one or more processors represented by the processor 1501 and various circuits of the memory represented by the memory 1503 are linked together. The bus architecture can also link various other circuits such as peripherals, voltage regulators, power management circuits, etc., which are all known in the art, and therefore, no further description will be given herein. The bus interface provides the interface. The transceiver 1502 may be a plurality of elements, that is, including a transmitter and a receiver, and provide a unit for communicating with various other devices on the transmission medium. For different user equipment, the user interface may also be an interface capable of connecting externally and internally with the required equipment. The connected equipment includes but not limited to a keypad, a display, a speaker, a microphone, a joystick, etc.

The processor 1501 is responsible for managing the bus architecture and general processing, and the memory 1503 can store data used by the processor 1501 when performing operations.

Optionally, the embodiment of the present disclosure further provides a base station, including a processor 1501, a memory 1503, and a computer program stored in the memory 1503 and running on the processor 1501. When the computer program is executed by the processor 1501, each process of the foregoing embodiment of the method of sending downlink channel is realized, and the same technical effect can be achieved. To avoid repetition, details are not described here.

Figure 16:
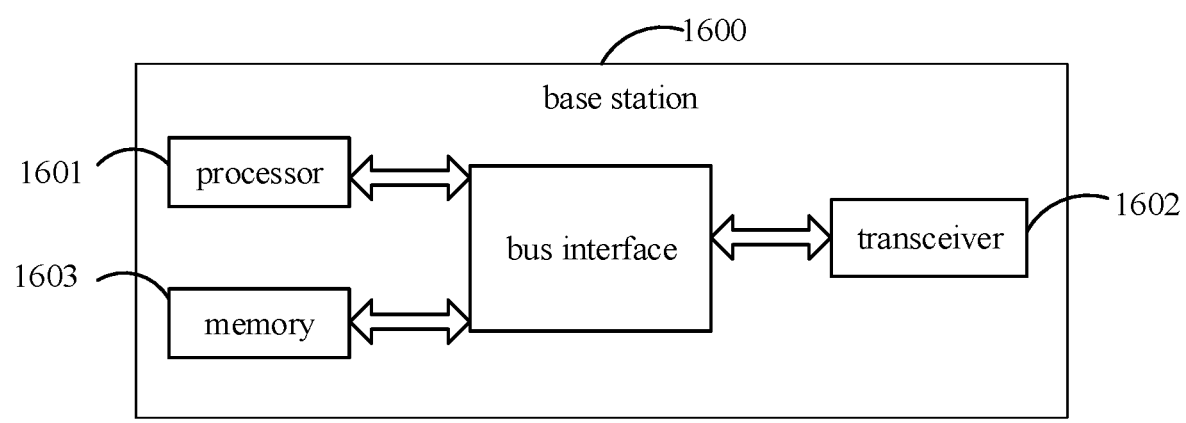
FIG. 16 is a structural view of another base station in an embodiment of the present disclosure.

Referring to FIG. 16 which is a structural view of another base station in an embodiment of the present disclosure. As shown in FIG. 16, the base station 1600 includes a processor 1601, a transceiver 1602, a memory 1603, and a bus interface, where:

The processor 1601 is configured to determine a Transmission Configuration Indication (TCI) state of a downlink data channel, where the TCI state is a TCI state of a Control Resource Set (CORESET) or a newly determined TCI state, and the CORESET is a CORESET with a lowest identification in a time domain resource on which Downlink Control Information (DCI) is transmitted, and the DCI is configured to schedule the downlink data channel.

The transceiver 1602 is configured to send the downlink data channel according to the TCI state.

Optionally, the data channel sending module 1102 is further configured to send the downlink data channel according to a spatial Quasi-colocation (QCL) parameter indicated by the TCI state.

Optionally, in the case that a scheduling offset of the DCI is smaller than or equal to a preset threshold, the TCI state is the TCI state of the CORESET, and the CORESET is the CORESET with the lowest identification on an active BWP in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification other than a CORESET with identification 0 in the time domain resource.

Optionally, in the case that a scheduling offset of the DCI is smaller than or equal to a preset threshold, the TCI state is the TCI state of the CORESET, and the TCI state of the CORESET is for a QCL indication of a control channel in the CORESET, and the CORESET is the CORESET with the lowest identification in CORESETs used for a unicast transmission in the time domain resource.

Optionally, in the case that the DCI includes a TCI field or does not include a TCI field, the TCI state is the TCI state of the CORESET.

Optionally, a downlink control channel or the downlink data channel is sent according to the TCI state with a high priority within a collision period, according to a preset priority rule or a priority rule configured by a base station;

where the collision period includes: an overlapping period between a using period of the TCI state of the downlink data channel and a using period of a TCI state of the current downlink control channel, or an overlapping period between a using period of the TCI state of the downlink data channel and a using period of a TCI state of a current downlink data channel, the TCI state of the current downlink control channel is configured by the base station for sending the downlink control channel, the TCI state of the current downlink data channel is a TCI state for downlink data channel which is indicated by the base station and effective.

Optionally, the preset priority rule or the priority rule configured by the base station includes at least one of:

a priority of the TCI state of the current downlink control channel is higher than a priority of the TCI state of the downlink data channel;

the priority of the TCI state of the current downlink control channel is lower than the priority of the TCI state of the downlink data channel;

a priority of the TCI state of the current downlink data channel is higher than the priority of the TCI state of the downlink data channel;

the priority of the TCI state of the current downlink data channel is lower than the priority of the TCI state of the downlink data channel.

Optionally, at least one of the downlink data channel and a downlink reference signal is sent according to a preset rule or a rule configured by a base station within a collision period;

where the collision period includes: an overlapping period between a using period of the TCI state of the downlink data channel and a using period of a TCI state of the downlink reference signal, the TCI state of the downlink reference signal is configured or indicated by the base station for sending the downlink reference signal.

Optionally, the downlink reference signal includes at least one of a Channel State Information Reference Signal (CSI-RS) and a Synchronization Signal Block (SSB);

the TCI state of the downlink data channel indicates a spatial Quasi-colocation (QCL) parameter for sending the downlink data channel, the TCI state of the downlink reference signal indicates a spatial QCL parameter for sending the downlink reference signal.

Optionally, the preset rule or the rule configured by the base station includes:

within the collision period, the TCI state configured or indicated by the base station for sending the downlink reference signal is the same as the TCI state of the downlink data channel; or within the collision period, the downlink data channel is sent according to the TCI state configured or indicated by the base station for sending the downlink reference signal.

Optionally, before determining the TCI state of the downlink data channel, the transceiver 1602 is further configured to determine for a terminal a TCI state of a CORESET with identification 0 through at least one of a configuring manner, an activating manner and an indicating manner, the TCI state is at least configured to indicate an SSB index that has a QCI relationship with the CORESET with identification 0, and the newly determined TCI state is determined by at least one of the configuring manner, the activating manner and the indicating manner.

Optionally, in the case that a scheduling offset of the DCI is smaller than or equal to a preset threshold, the TCI state of the downlink data channel is the newly determined TCI state.

Optionally, the configuring manner refers to configuring through a Radio Resource Control (RRC) signaling;

the activating manner refers to: activating, by a Media Access Control Control Element (MAC CE), one of a plurality of TCI states configured through a RRC signaling; and the indicating manner refers to indicating by an MAC CE or through a physical layer control signaling.

The aforementioned base station can improve the reliability and accuracy of data transmission.

The transceiver 1602 is configured to receive and send data under the control of the processor 1601, and the transceiver 1602 includes at least two antenna ports.

In FIG. 16, the bus architecture may include any number of interconnected buses and bridges. Specifically, one or more processors represented by the processor 1601 and various circuits of the memory represented by the memory 1603 are linked together. The bus architecture can also link various other circuits such as peripherals, voltage regulators, power management circuits, etc., which are all known in the art, and therefore, no further description will be given herein. The bus interface provides the interface. The transceiver 1602 may be a plurality of elements, that is, including a transmitter and a receiver, and provide a unit for communicating with various other devices on the transmission medium. For different user equipment, the user interface may also be an interface capable of connecting externally and internally with the required equipment. The connected equipment includes but not limited to a keypad, a display, a speaker, a microphone, a joystick, etc.

The processor 1601 is responsible for managing the bus architecture and general processing, and the memory 1603 can store data used by the processor 1601 when performing operations.

Optionally, a base station is further provided in an embodiment of the present disclosure, including a processor 1601, a memory 1603, and a computer program stored in the memory 1603 and running on the processor 1601. When the computer program is executed by the processor 1601, each process of the foregoing embodiment of the method of sending downlink channel is realized, and the same technical effect can be achieved. To avoid repetition, details are not described here.

The embodiments of the present disclosure also provide a computer-readable storage medium, and a computer program is stored in the computer-readable storage medium. When the computer program is executed by a processor, the various downlink channel receiving method embodiments provided by the embodiments of the present disclosure are implemented. Each process, or the computer program when executed by the processor, implements each process of the various downlink channel sending method embodiments provided in the embodiments of the present disclosure, and can achieve the same technical effect. To avoid repetition, details are not described herein again. The computer-readable storage medium, such as Read-Only Memory (ROM), a Random Access Memory (RAM), magnetic disk, or optical disk, etc.

It should be noted that in this article, the terms "include", "including" or any other variants thereof are intended to cover non-exclusive inclusion, so that a process, method, article or device including a series of elements not only includes those elements, It also includes other elements not explicitly listed, or elements inherent to the process, method, article, or device.

If there are no more restrictions, the element defined by the sentence "including a . . . " does not exclude the existence of other identical elements in the process, method, article or device that includes the element.

Through the description of the above embodiments, those skilled in the art can clearly understand that the method of the above embodiments can be implemented by means of software plus the necessary general hardware platform. Of course, it can also be implemented by hardware, but in many cases the former is better. 的实施方式。

Based on this understanding, the technical solution of the present disclosure essentially or the part that contributes to the related technology can be embodied in the form of a software product. The computer software product is stored in a storage medium (such as ROM/RAM, magnetic disk, optical disk).) Includes several instructions to make a terminal (which may be a mobile phone, a computer, a server, an air conditioner, or a network device, etc.) execute the methods described in the various embodiments of the present disclosure.

The embodiments of the present disclosure are described above with reference to the drawings, but the present disclosure is not limited to the above-mentioned specific embodiments. The above-mentioned specific embodiments are only illustrative and not restrictive. For those of ordinary skill in the art, many forms can be made without departing from the principle of the present disclosure and the scope of the claims, all of which fall within the scope of the present disclosure.

What is claimed is:

1. A method of receiving downlink channel, applied to a terminal, comprising:
    determining a Transmission Configuration Indication (TCI) state of a downlink data channel, wherein the TCI state is newly determined TCI state; and
    receiving the downlink data channel according to the TCI state;

wherein a receiving of a downlink control channel or the downlink data channel is performed according to the TCI state with a high priority within a collision period, according to a preset priority rule or a priority rule configured by a base station;

wherein the collision period comprises: an overlapping period between a using period of the TCI state of the downlink data channel and a using period of a TCI state for a current receiving of downlink control channel, the TCI state for the current receiving of downlink control channel is configured by the base station for receiving the downlink control channel;

wherein the preset priority rule comprises:
a priority of the TCI state for the current receiving of downlink control channel is higher than a priority of the TCI state of the downlink data channel.

2. The method according to claim 1, wherein the receiving the downlink data channel according to the TCI state comprises:
receiving the downlink data channel according to a spatial Quasi-colocation (QCL) parameter indicated by the TCI state.

3. The method according to claim 1,
wherein the preset priority rule further comprises at least one of:
the priority of the TCI state for the current receiving of downlink control channel is lower than the priority of the TCI state of the downlink data channel;
a priority of the TCI state of the current downlink data channel is higher than the priority of the TCI state of the downlink data channel;
the priority of the TCI state of the current downlink data channel is lower than the priority of the TCI state of the downlink data channel.

4. The method according to claim 1, wherein at least one of the downlink data channel and a downlink reference signal is received according to the preset rule within the collision period;
wherein the collision period comprises: an overlapping period between a using period of the TCI state of the downlink data channel and a using period of a TCI state of the downlink reference signal, the TCI state of the downlink reference signal is configured or indicated by the base station for receiving the downlink reference signal;
wherein the downlink reference signal comprises at least one of a Channel State Information Reference Signal (CSI-RS) and a Synchronization Signal Block (SSB);
the TCI state of the downlink data channel indicates a spatial Quasi-colocation (QCL) parameter for receiving the downlink data channel, the TCI state of the downlink reference signal indicates a spatial QCL parameter for receiving the downlink reference signal;
or,
the preset rule comprises:
within the collision period, the TCI state configured or indicated by the base station for receiving the downlink reference signal is the same as the TCI state of the downlink data channel; or
within the collision period, the downlink data channel is received according to the TCI state configured or indicated by the base station for receiving the downlink reference signal.

5. The method according to claim 1, wherein prior to the determining the TCI state of the downlink data channel, the method further comprises:

acquiring a TCI state which is determined by a base station for a CORESET with identification 0 through at least one of a configuring manner, an activating manner and an indicating manner, wherein the TCI state is at least used to indicate an SSB index that has a QCI relationship with the CORESET with identification 0, and the newly determined TCI state is determined by at least one of the configuring manner, the activating manner and the indicating manner;

wherein in the case that a scheduling offset of the DCI is smaller than or equal to a preset threshold, the TCI state of the downlink data channel is the newly determined TCI state;

or,
the configuring manner refers to configuring through a Radio Resource Control (RRC) signaling;
the activating manner refers to: activating, by a Media Access Control Control Element (MAC CE), one of a plurality of TCI states configured through a RRC signaling; and
the indicating manner refers to indicating by an MAC CE or through a physical layer control signaling.

6. A terminal, comprising: a memory, a processor and a computer program stored in the memory and executable on the processor, wherein the processor executes the computer program to perform the method of receiving downlink channel according to claim 1.

7. A method of sending downlink channel, applied to a base station, comprising:
determining a Transmission Configuration Indication (TCI) state of a downlink data channel, wherein the TCI state is a newly determined TCI state; and
sending the downlink data channel according to the TCI state;
wherein a downlink control channel or the downlink data channel is sent according to the TCI state with a high priority within a collision period, according to a preset priority rule or a priority rule configured by a base station;
wherein the collision period comprises: an overlapping period between a using period of the TCI state of the downlink data channel and a using period of a TCI state of a current downlink control channel, the TCI state of the current downlink control channel is configured by the base station for sending the downlink control channel;
wherein the preset priority rule comprises:
a priority of the TCI state of the current downlink control channel is higher than a priority of the TCI state of the downlink data channel.

8. The method according to claim 7, wherein the sending the downlink data channel according to the TCI state comprises:
sending the downlink data channel according to a spatial Quasi-colocation (QCL) parameter indicated by the TCI state.

9. The method according to claim 7, wherein
the preset priority rule further comprises at least one of:
the priority of the TCI state of the current downlink control channel is lower than the priority of the TCI state of the downlink data channel;
a priority of the TCI state of the current downlink data channel is higher than the priority of the TCI state of the downlink data channel;
the priority of the TCI state of the current downlink data channel is lower than the priority of the TCI state of the downlink data channel.

10. The method according to claim 7, wherein at least one of the downlink data channel and a downlink reference signal is sent according to the preset rule within the collision period;
- wherein the collision period comprises: an overlapping period between a using period of the TCI state of the downlink data channel and a using period of a TCI state of the downlink reference signal, the TCI state of the downlink reference signal is configured or indicated by the base station for sending the downlink reference signal;
- wherein the downlink reference signal comprises at least one of a Channel State Information Reference Signal (CSI-RS) and a Synchronization Signal Block (SSB);
- the TCI state of the downlink data channel indicates a spatial Quasi-colocation (QCL) parameter for sending the downlink data channel, the TCI state of the downlink reference signal indicates a spatial QCL parameter for sending the downlink reference signal;
- or,
- the preset rule comprises:
- within the collision period, the TCI state configured or indicated by the base station for sending the downlink reference signal is the same as the TCI state of the downlink data channel; or
- within the collision period, the downlink data channel is sent according to the TCI state configured or indicated by the base station for sending the downlink reference signal.

11. The method according to claim 7, wherein prior to the determining the TCI state of the downlink data channel, the method further comprises:
- determining for a terminal a TCI state of a CORESET with identification 0 through at least one of a configuring manner, an activating manner and an indicating manner, wherein the TCI state is at least configured to indicate an SSB index that has a QCI relationship with the CORESET with identification 0, and the newly determined TCI state is determined by at least one of the configuring manner, the activating manner and the indicating manner;
- wherein in the case that a scheduling offset of the DCI is smaller than or equal to a preset threshold, the TCI state of the downlink data channel is the newly determined TCI state;
- or,
- the configuring manner refers to configuring through a Radio Resource Control (RRC) signaling;
- the activating manner refers to: activating, by a Media Access Control Control Element (MAC CE), one of a plurality of TCI states configured through a RRC signaling; and
- the indicating manner refers to indicating by an MAC CE or through a physical layer control signaling.

12. A base station, comprising: a memory, a processor and a computer program stored in the memory and executable on the processor, wherein the processor executes the computer program to perform the method of sending downlink channel according to claim 7.

* * * * *